(12) United States Patent
Shigeno

(10) Patent No.: US 10,793,387 B2
(45) Date of Patent: Oct. 6, 2020

(54) IMAGE READING APPARATUS

(71) Applicant: BROTHER KOGYO KABUSHIKI KAISHA, Aichi-ken (JP)

(72) Inventor: Hiroaki Shigeno, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 70 days.

(21) Appl. No.: 16/262,871

(22) Filed: Jan. 30, 2019

(65) Prior Publication Data

US 2019/0233239 A1    Aug. 1, 2019

(30) Foreign Application Priority Data

Jan. 31, 2018  (JP) ................. 2018-014383

(51) Int. Cl.
| | |
|---|---|
| B65H 29/50 | (2006.01) |
| B65H 1/18 | (2006.01) |
| B65H 7/02 | (2006.01) |
| B65H 1/14 | (2006.01) |

(Continued)

(52) U.S. Cl.
CPC ............ B65H 29/50 (2013.01); B65H 1/14 (2013.01); B65H 1/18 (2013.01); B65H 3/0669 (2013.01); B65H 3/0684 (2013.01); B65H 7/02 (2013.01); B65H 7/04 (2013.01); B65H 2403/42 (2013.01); B65H 2403/53 (2013.01); B65H 2405/3321 (2013.01); B65H 2553/612 (2013.01); B65H 2801/06 (2013.01); B65H 2801/39 (2013.01)

(58) Field of Classification Search
CPC .......... B65H 29/50; B65H 1/18; B65H 29/22; B65H 2511/152; B65H 2553/612; B65H 43/06; B65H 1/14; B65H 3/0684; B65H 3/0669; B65H 7/04; B65H 7/02; B65H 2405/3321; B65H 2801/39; B65H 2403/53

USPC ........................................... 271/201; 399/367
See application file for complete search history.

(56) References Cited

U.S. PATENT DOCUMENTS

| | | | |
|---|---|---|---|
| 7,364,155 B2 * | 4/2008 | Nagao ................. | B65H 1/08 |
| | | | 271/186 |
| 7,564,600 B2 * | 7/2009 | Shoji .................. | H04N 1/00631 |
| | | | 358/498 |

(Continued)

FOREIGN PATENT DOCUMENTS

| | | | | |
|---|---|---|---|---|
| JP | 57111683 A | * | 7/1982 | ........... B65H 29/50 |
| JP | 10-167545 A | | 6/1998 | |
| JP | 2005-8283 A | | 1/2005 | |

*Primary Examiner* — Jeremy R Severson
(74) *Attorney, Agent, or Firm* — Kenealy Vaidya LLP

(57) ABSTRACT

An image reading apparatus includes a supply tray which supports sheets and includes a movable plate configured to move in correspondence to reduction in a number of the sheets, a discharge tray which is located below the supply tray; a discharge unit which has a discharge opening for discharging the sheet and moves from a lower position and a higher position in correspondence to reduction in the number of the sheets supported on the supply tray, a controller which controls movements of the movable plate and the discharge unit, and a sheet detection unit which detects whether the sheets supported on the discharge tray is lower than a predetermined height. The controller determines a timing to move the discharge unit from the higher position toward the lower position based on a detection result of the sheet detection unit.

11 Claims, 12 Drawing Sheets

(51) Int. Cl.
*B65H 3/06* (2006.01)
*B65H 7/04* (2006.01)

(56) References Cited

U.S. PATENT DOCUMENTS

| | | | | |
|---|---|---|---|---|
| 7,828,288 | B2* | 11/2010 | Kim | B65H 29/50 |
| | | | | 271/200 |
| 9,670,026 | B2* | 6/2017 | Watanabe | B65H 5/062 |
| 10,584,007 | B2* | 3/2020 | Matsumura | B65H 7/14 |

* cited by examiner

IMAGE READING APPARATUS

CROSS-REFERENCE TO RELATED APPLICATION

This application claims priority from Japanese Patent Application No. 2018-014383, filed on Jan. 31, 2018, the entire subject matter of which is incorporated herein by reference.

TECHNICAL FIELD

Aspects of the present invention relate to an image reading apparatus.

BACKGROUND

JP-A-2005-8283 discloses a document feeding apparatus, which is an example of a related-art image reading apparatus. The sheet feeding apparatus includes a feeder tray, a sheet discharge tray and a conveyance guide. The feeder tray is configured to support a sheet to be fed. The sheet discharge tray is located below the feeder tray, and is configured to support the discharged sheet. The conveyance guide is configured to convey the sheet from the feeder tray toward the sheet discharge tray. An image reading position for reading an image on the document to be conveyed on the conveyance guide is set in the middle of the conveyance guide.

The feeder tray moves upward to come close to a sheet pickup unit in correspondence to reduction in the number of sheets supported on the feeder tray. The sheet feeding apparatus further includes a swinging conveyance unit. The swinging conveyance unit has a discharge opening for discharging the sheet conveyed by the conveyance guide to the sheet discharge tray. The swinging conveyance unit moves upward to space the discharge opening from the sheet discharge tray in correspondence to reduction in the number of the sheets supported on the feeder tray. Specifically, a link member is provided between the feeder tray and the swinging conveyance unit, so that the discharge opening of the swinging conveyance unit moves upward and downward in correspondence to upward and downward movement of the feeder tray. Accordingly, the sheet feeding apparatus can be size-reduced in an upper and lower direction.

An image reading apparatus having a configuration similar to the above-described sheet feeding apparatus is assumed. The image reading apparatus includes a supply tray having a movable plate, and a discharge unit. The discharge unit has a discharge opening for discharging a sheet to a discharge tray. A link member is provided between the movable plate of the supply tray and the discharge unit. The discharge opening of the discharge unit moves upward and downward in correspondence to upward and downward movement of the movable plate of the supply tray.

In the above image reading apparatus, it is necessary to move downward the discharge unit after an image reading operation is over and before a next image reading operation starts. However, when the discharge unit is moved downward in a state where the sheet is left on the discharge tray, the left sheet is likely to interfere with a sheet that is to be discharged from the discharge opening of the discharge unit during the next image reading operation, so that sheet jamming is likely to occur.

SUMMARY

Aspects of the present invention provide an image reading apparatus capable of suppressing jamming of a sheet that is to be discharged from a discharge opening.

According to an illustrative embodiment of the present invention, there is provided an image reading apparatus including a supply tray, a discharge tray, a conveyance guide, a reading sensor, a discharge unit, a controller and a sheet detection unit. The supply tray is configured to support sheets to be fed and includes a movable plate configured to move from a first position to a second position in correspondence to reduction in a number of the sheets supported on the supply tray. The second position is higher than the first position. The discharge tray is located below the supply tray and configured to support discharged sheets. The conveyance guide is configured to guide a sheet conveyed from the supply tray toward the discharge tray. The reading sensor is configured to read an image on the sheet conveyed along the conveyance guide. The discharge unit has a discharge opening for discharging the sheet conveyed along the conveyance guide to the discharge tray and is configured to move from a third position to a fourth position in correspondence to reduction in the number of the sheets supported on the supply tray. The fourth position is higher than the third position. The controller is configured to control movements of the movable plate and the discharge unit. The sheet detection unit is configured to detect whether the sheets supported on the discharge tray is lower than a predetermined height. The controller is configured to determine a timing to move the discharge unit from the fourth position toward the third position based on a detection result of the sheet detection unit.

According to the above-described image reading apparatus, as the predetermined height, a height may be set at which the sheet, which is to be discharged from the discharge opening of the discharge unit during a next image reading operation, is to be interrupted. The predetermined height may be a full-load height or may be within a range of 0<predetermined height <full-load height, for example. Also, the predetermined height may increase in correspondence to a posture of the discharge unit when the discharge unit moves toward the fourth position, and the predetermined height may be the full-load height in a state where the discharge unit is located at the fourth position. The controller may check that the sheets of the predetermined height or higher are not left on the discharge tray, based on the detection result of the sheet detection unit, after the image reading operation is over and before a next image reading operation starts, and then determine the timing to move the discharge unit from the fourth position toward the third position. Accordingly, in the image reading apparatus, it is possible to start the next image reading operation in a state where the sheets of the predetermined height or higher are not left on the discharge tray.

Therefore, according to the above-described image reading apparatus, it is possible to suppress the jamming of the sheet that is to be discharged from the discharge opening.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, first and second illustrative embodiments of the present invention will be described with reference to the drawings.

First Illustrative Embodiment

Figure 1:
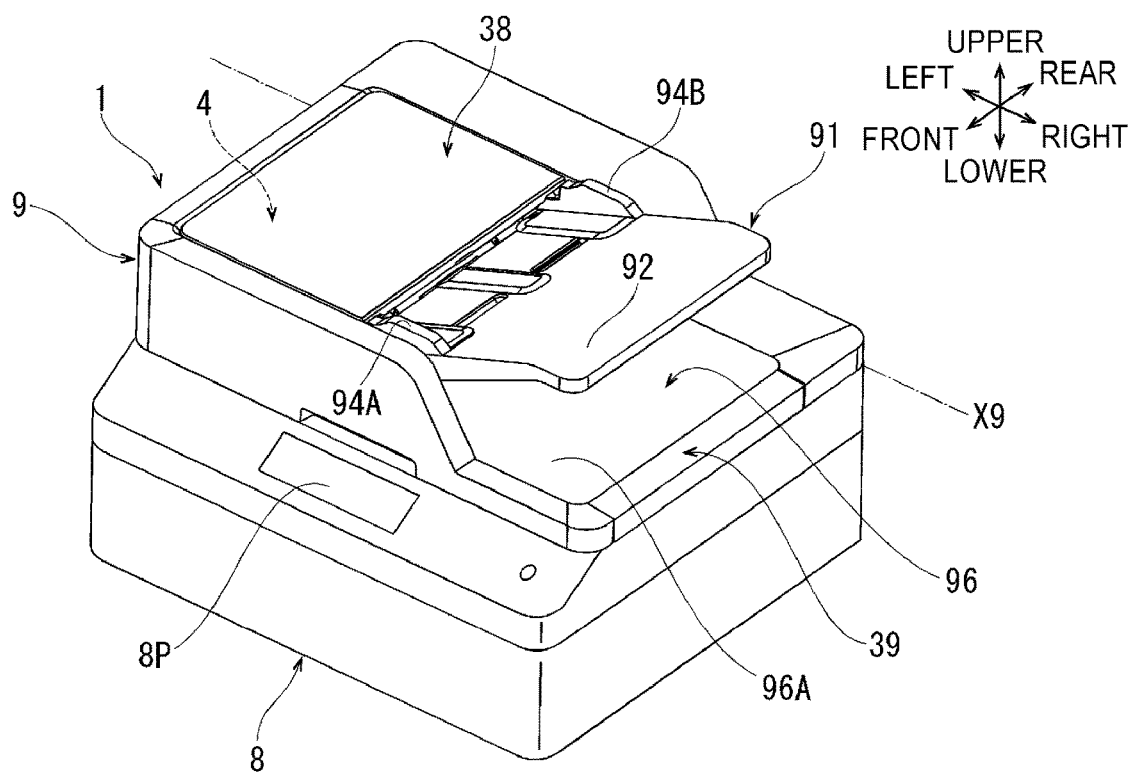
FIG. 1 is a perspective view of an image reading apparatus of a first illustrative embodiment.

FIG. 1 illustrates an image reading apparatus 1 of a first illustrative embodiment of the present invention. In FIG. 1, a side at which an operation panel 8P is provided is defined as the front of the apparatus and a left side of the operation panel 8P is defined as the left, so that the front and rear, right and left and upper and lower directions are respectively shown. The respective directions shown in the respective drawings of FIG. 2 and thereafter are shown in correspondence to the respective directions shown in FIG. 1. In the below, the respective constitutional elements of the image reading apparatus 1 are described with reference to FIG. 1 and the like.

<Overall Configuration>

Figure 2:
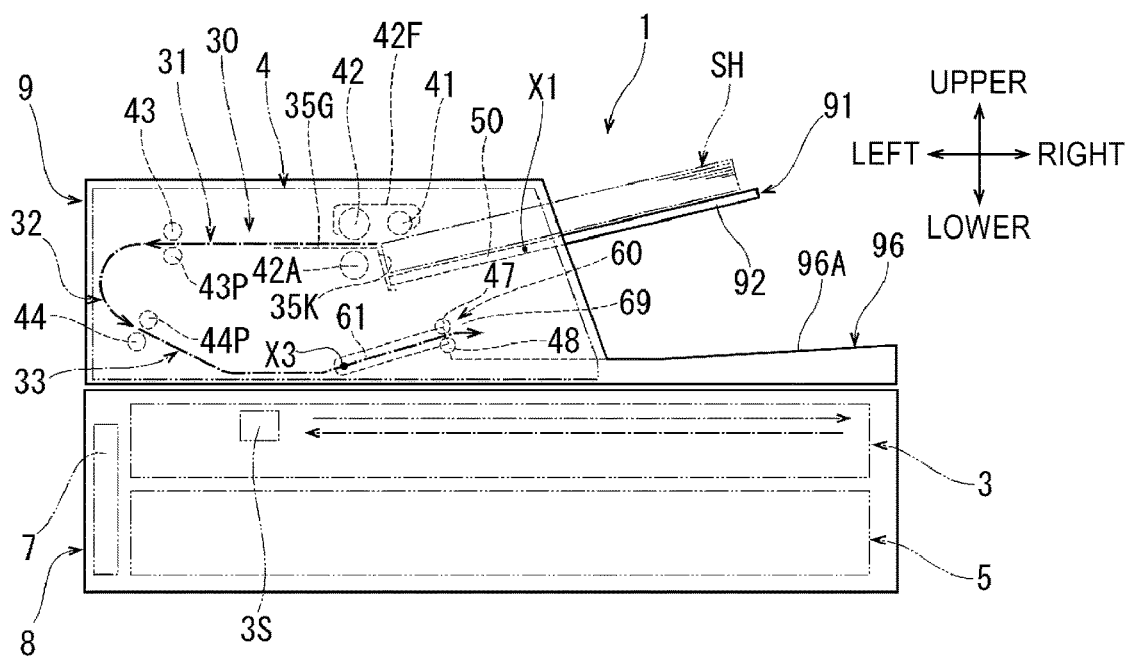
FIG. 2 is a schematic front view of the image reading apparatus of the first illustrative embodiment.
Figure 3:
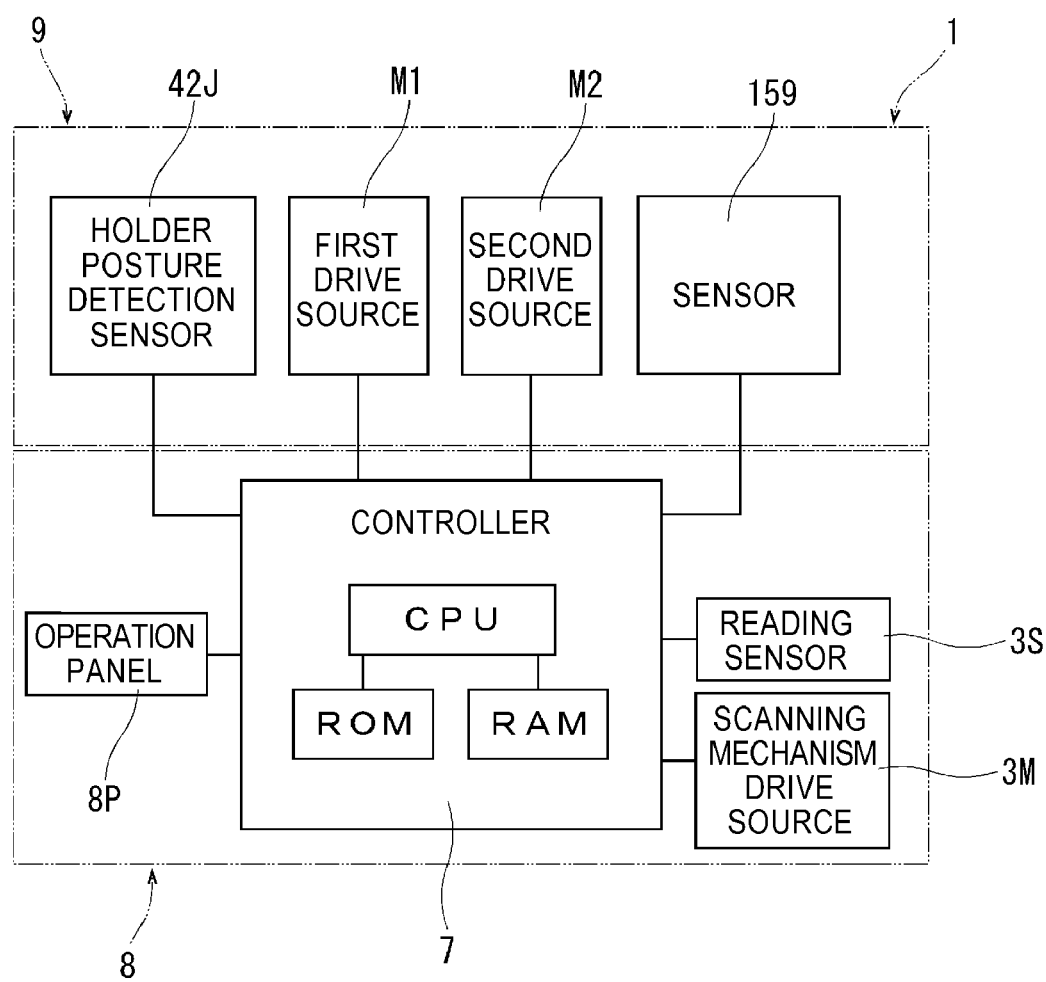
FIG. 3 is a block diagram of the image reading apparatus of the first illustrative embodiment.

As shown in FIGS. 1 to 3, the image reading apparatus 1 includes a main body part 8, an opening/closing part 9, an image forming unit 5, a reading unit 3, an automatic conveyance mechanism 4 and a controller 7. The main body part 8 is a substantially flat box-shaped member. As shown in FIG. 1, a front face of the main body part 8 is provided with an operation panel 8P, which is a touch panel or the like.

Figure 4:
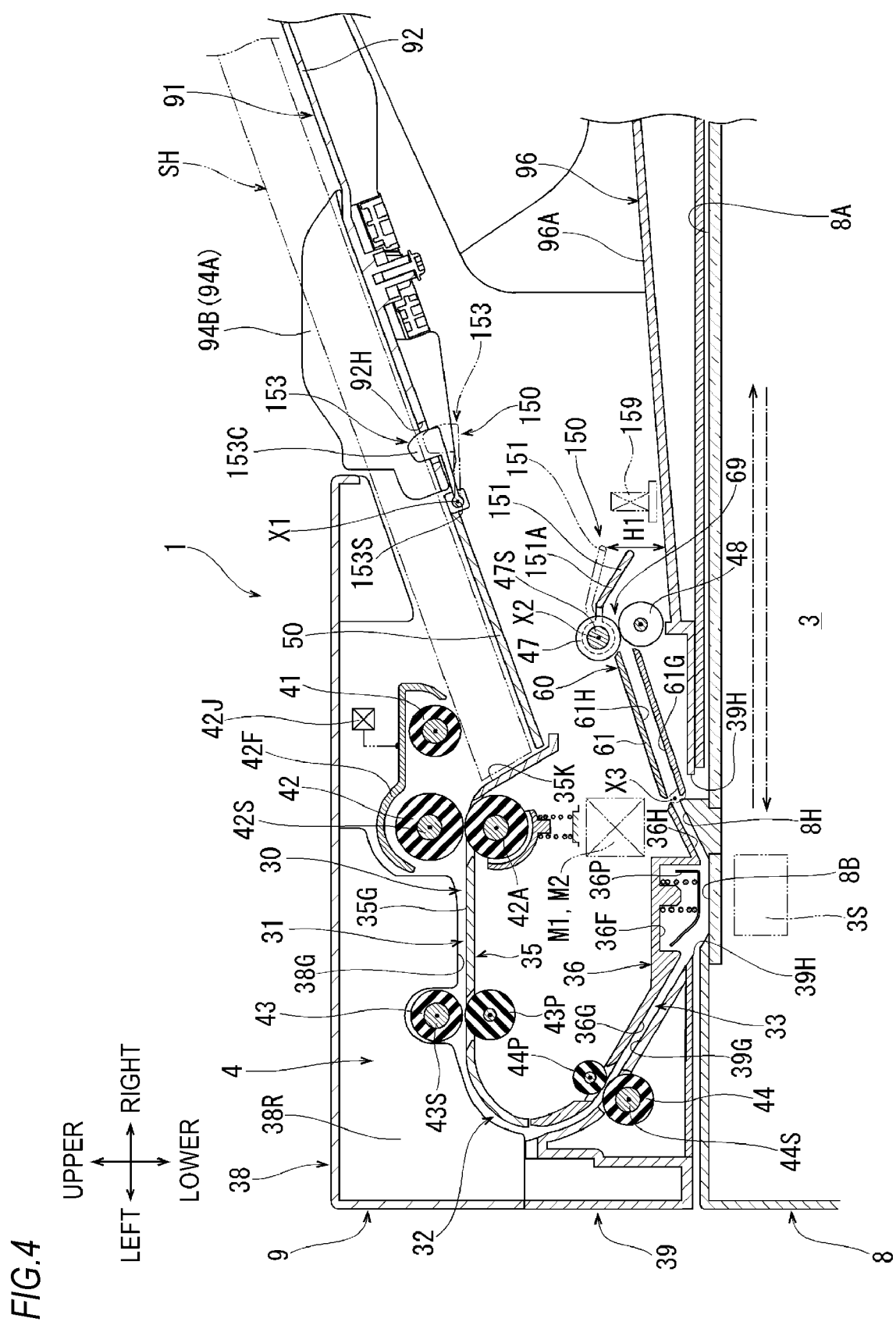
FIG. 4 is a partial sectional view of the image reading apparatus of the first illustrative embodiment.

As shown in FIG. 2, the image forming unit 5 is accommodated at a lower part in the main body part 8. The image forming unit 5 is configured to form an image on a sheet by an inkjet or laser method. As shown in FIGS. 2 and 4, the reading unit 3 is located at an upper part in the main body part 8. The reading unit 3 is configured to rear an image on a sheet or a document. The automatic conveyance mechanism 4 is provided to the opening/closing part 9. The automatic conveyance mechanism 4 is configured to sequentially convey sheets SH supported on a supply tray 91 along a conveyance guide 30 when the reading unit 3 reads an image on a sheet SH.

As shown in FIGS. 2 and 3, the controller 7 is accommodated at a position along a left surface in the main body part 8. The controller 7 is configured by a microcomputer having a CPU, a ROM and a RAM as main parts. The ROM stores a program with which the CPU controls various operations of the image reading apparatus 1, a program with which the CPU executes identification processing, and the like. The RAM is used as a storage area which temporarily stores data and signals to be used when the CPU executes the programs or a work area of data processing. The controller 7 is configured to control the image forming unit 5, the reading unit 3, the automatic conveyance mechanism 4 and the operation panel 8P.

As shown in FIG. 4, a platen glass is provided on an upper surface of the main body part 8, and a large-area document support surface 8A is formed by an upper surface of the platen glass. A separate platen glass is provided at the left of the document support surface 8A on the upper surface of the main body part 8, and a reading surface 8B extends in the front and rear direction is formed by an upper surface of the separate platen glass.

When the reading unit 3 reads an image on a stationary document, the document support surface 8A supports the document from below. The document to be read may include a sheet such as an OH sheet, a book and the like.

When the reading unit 3 reads an image on the sheet SH, which is conveyed one by one by the automatic conveyance mechanism 4, the reading surface 8B contacts the sheet SH from below. A guide convex part 8H is provided between the document support surface 8A and the reading surface 8B on the upper surface of the main body part 8. The guide convex part 8H is configured to pickup and guide the sheet SH, which is conveyed with contacting the reading surface 8B, in a rightward upward sloped direction.

In the first illustrative embodiment, an object of which an image is to be read using the document support surface 8A is referred to as a document, and an object of which an image is to be read with being conveyed by the automatic conveyance mechanism 4 is referred to as a sheet. The document and the sheet may be substantially the same.

As shown in FIG. 1, the opening/closing part 9 is supported to be swingable about an opening/closing shaft axis X9 extending in the right and left direction by a hinge (not shown) arranged at a rear end portion of the main body part 8. In a closed state shown in FIGS. 1, 4 and the like, the opening/closing part 9 is configured to cover the document support surface 8A and the reading surface 8B from above. Although not shown, the opening/closing part 9 is configured to swing about the opening/closing shaft axis X9 such that a front end portion thereof is to be displaced upward and rearward, so as to move to an open position at which the document support surface 8A and the reading surface 8B are exposed. Accordingly, a user can place a document to be read on the document support surface 8A.

Herein, when describing a configuration, an internal structure and the like of the opening/closing part 9, the upper and lower direction and the front and rear direction are described based on a posture of the opening/closing part 9 in the closed state.

As shown in FIGS. 2 to 5, the reading unit 3 includes a reading sensor 3S accommodated at an upper part in the main body part 8, a scanning mechanism drive source 3M shown in FIG. 4, and a scanning mechanism (not shown) configured to be driven by the scanning mechanism drive source 3M. The reading sensor 3S may include a known image reading sensor such as a Contact Image Sensor (CIS), a Charge Coupled Device (CCD) or the like.

As shown in FIG. 4, the reading sensor 3S is located below the document support surface 8A and the reading surface 8B. The scanning mechanism (not shown) is driven by the scanning mechanism drive source 3M when reading the image on the document supported on the document support surface 8A and reciprocally moves the reading sensor 3S in the right and left direction below the document support surface 8A in the main body part 8. Also, the scanning mechanism (not shown) is driven by the scanning mechanism drive source 3M when the reading sensor 3S reads the image on the sheet SH, which is conveyed by the automatic conveyance mechanism 4 and stops the reading sensor 3S at a position below the reading surface 8B in the main body part 8. The position at which the reading sensor 3S is stopped below the reading surface 8B is a preset stationary reading position.

Figure 5:
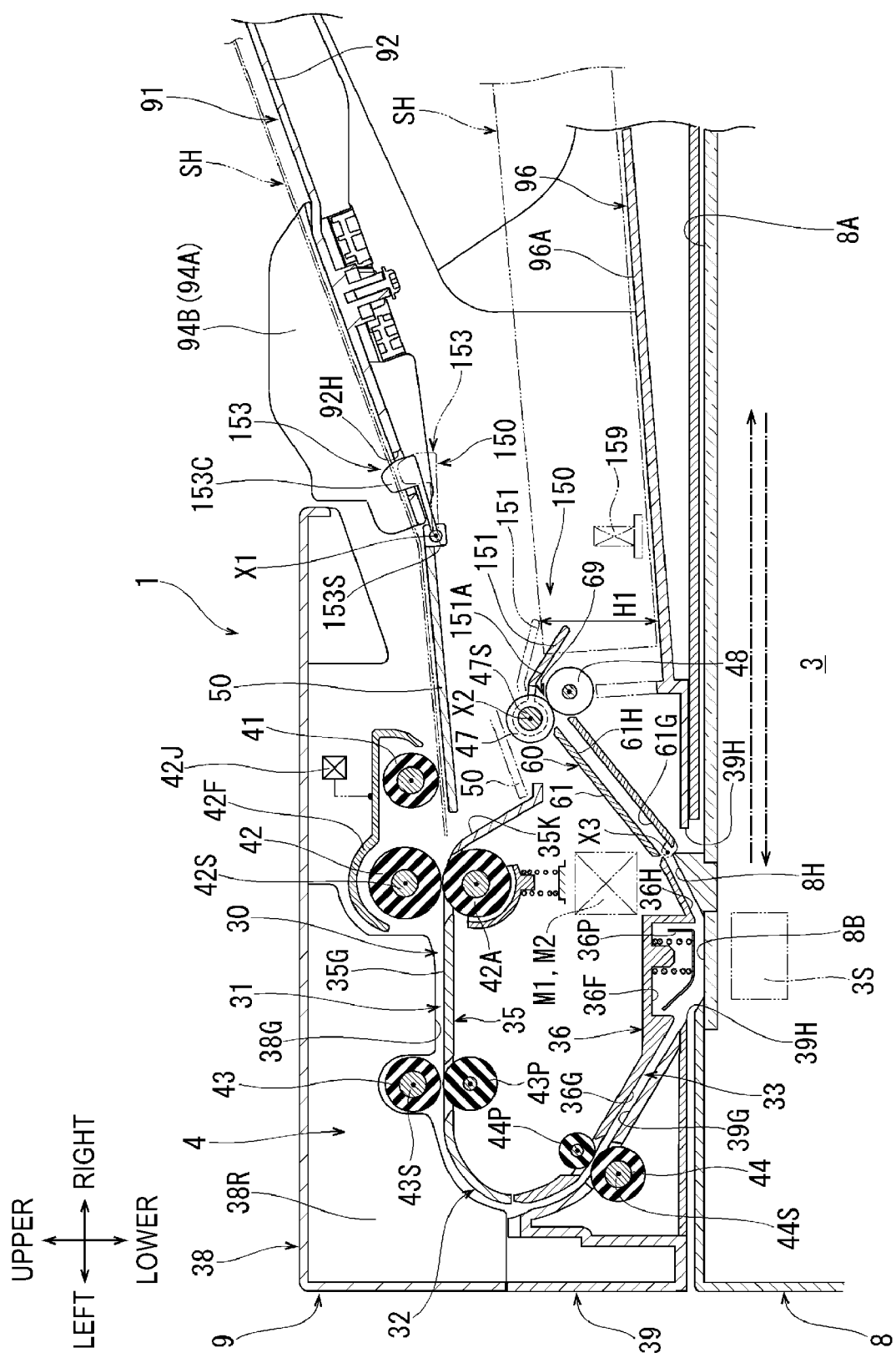
FIG. 5 is a partial sectional view of the image reading apparatus of the first illustrative embodiment.

As shown in FIGS. 4 and 5, the opening/closing part 9 includes a base member 39, a first chute member 35, a second chute member 36 and a cover member 38.

The base member 39 forms a bottom wall of the opening/closing part 9. The base member 39 has a rectangular hole 39H formed by cutting an area, which faces the reading surface 8B and the guide convex part 8H, into a substantially rectangular shape. A part located at the left of the rectangular hole 39H of the base member 39 has a conveyance surface 39G. A left end portion of the conveyance surface 39G is curved so as to be sloped downward and rightward with changing a direction thereof from a downward direction. The conveyance surface 39G is sloped downward up to a left end edge of the rectangular hole 39H.

The second chute member 36 is provided at a left upper part of the base member 39. The second chute member 36 has a pressing member holding part 36F and guide surfaces 36G, 36H. The pressing member holding part 36F is a concave part, which is concave upward at a position facing the reading surface 8B. A pressing member 36P is held to be displaceable in the upper and lower direction in the pressing member holding part 36F. The pressing member 36P is configured to press the sheet SH from above, which is conveyed with contacting the reading surface 8B, so as to suppress the sheet SH from floating from the reading surface 8B. The guide surface 36G is located at the left of the pressing member holding part 36F. A left end portion of the guide surface 36G is curved along a left end portion of the conveyance surface 39G of the base member 39. The guide surface 36G is sloped downward and rightward along the downward sloped part of the conveyance surface 39G of the base member 39. The guide surface 36H is located at the right of the pressing member holding part 36F. The guide surface 36H is sloped upward and rightward along the guide convex part 8H of the main body part 8.

The first chute member 35 is provided above the second chute member 36. The first chute member 35 has a regulation surface 35K and a conveyance surface 35G. The regulation surface 35K is sloped upward and leftward from a right end portion of the first chute member 35. The conveyance surface 35G is connected to an upper end of the regulation surface 35K and extends leftward in a substantially horizontal direction. A left end portion of the conveyance surface 35G is curved to change a direction from the leftward direction to a downward direction.

The cover member 38 is provided above the first chute member 35. The cover member 38 has a guide surface 38G configured by lower end edges of a plurality of ribs 38R protruding downward. A right end portion of the guide surface 38G faces the conveyance surface 35G from above at a position offset leftward from a connection part of the regulation surface 35K and the conveyance surface 35G of the first chute member 35. The guide surface 38G extends leftward in the substantially horizontal direction along the conveyance surface 35G of the first chute member 35. A left end portion of the guide surface 38G is curved along the left end portion of the conveyance surface 35G of the first chute member 35.

Figure 6:
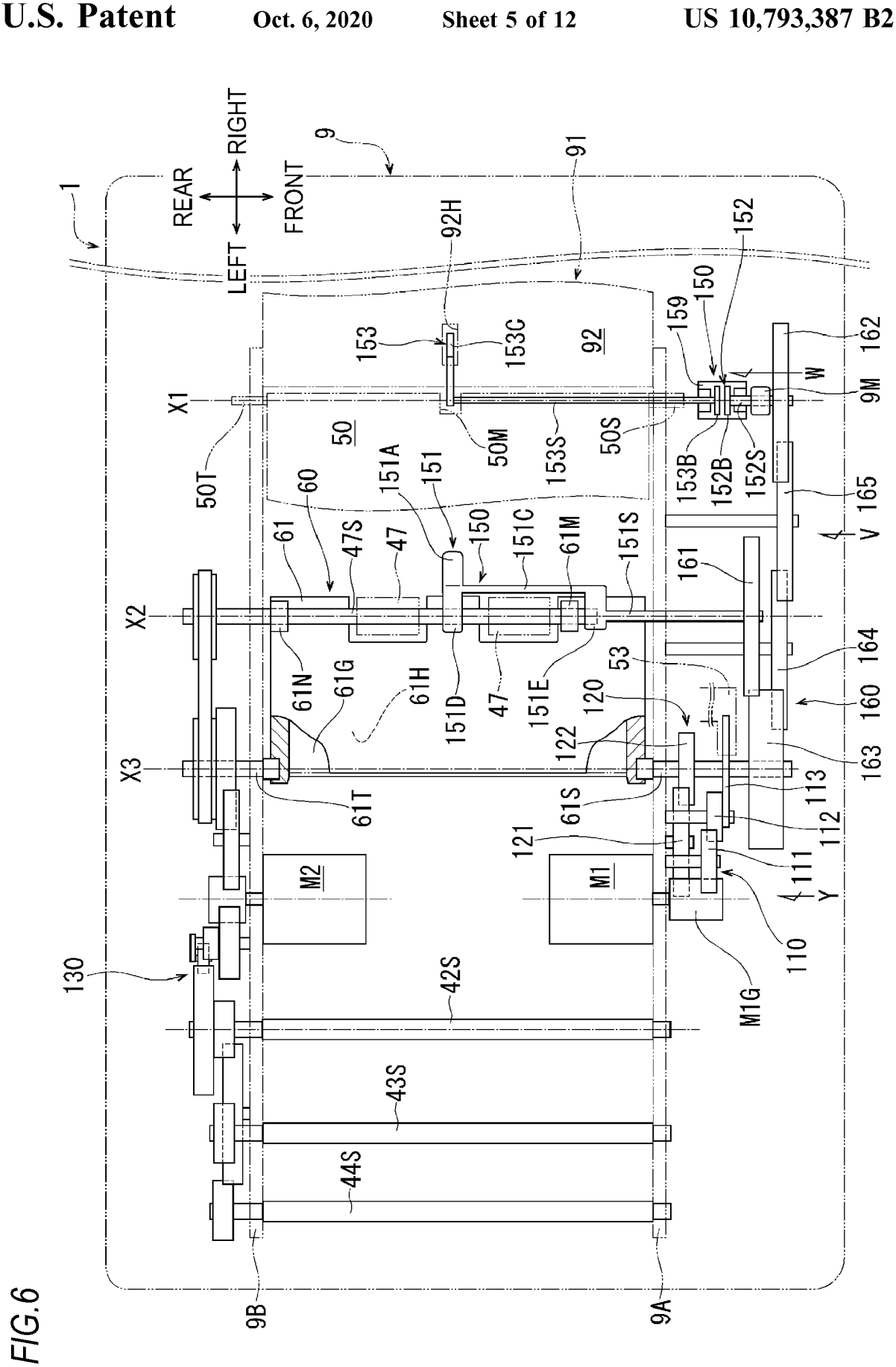
FIG. 6 is a schematic top view of the image reading apparatus of the first illustrative embodiment.

As shown in FIG. 6, the opening/closing part 9 has a first side frame 9A and a second side frame 9B. The first side frame 9A is provided to extend in the right and left direction at a front face-side of the opening/closing part 9 and configures a part of an internal frame of the opening/closing part 9. The second side frame 9B is provided to extend in the right and left direction at a rear face-side of the opening/closing part 9 and configures a part of the internal frame of the opening/closing part 9. The first side frame 9A and the second side frame 9B face each other in the front and rear direction so as to interpose therebetween the guide surface 38G of the cover member 38, the regulation surface 35K and the conveyance surface 35G of the first chute member 35, the guide surfaces 36G, 36H of the second chute member 36 and the conveyance surface 39G of the base member 39 shown in FIG. 5 and the like. In FIG. 6, for ease of the description, a supply tray main body 92 of the supply tray 91 and a part of the movable plate 50 are simplified. Also, in FIG. 6, for ease of the description, positions of a first drive source M1 and a second drive source M2 are shown with being offset rightward from a position below a rotary shaft 42S of a separation roller 42.

As shown in FIGS. 2, 4 and 5, the opening/closing part 9 includes the conveyance guide 30 configuring a part of the automatic conveyance mechanism 4, the supply tray 91 for supporting the sheet SH to be fed to the conveyance guide 30, and a discharge tray 96 for supporting the sheet SH to be discharged from the conveyance guide 30.

As shown in FIG. 4, the supply tray 91 is located at the right of the first chute member 35 and is provided above a right part of the base member 39. The supply tray 91 includes the supply tray main body 92 and the movable plate 50. The supply tray main body 92 is gently sloped downward and leftward from the right end portion-side of the opening/closing part 9. The movable plate 50 is provided to be adjacent to a left end portion of the supply tray main body 92. The movable plate 50 extends in a substantially flat plate shape toward the regulation surface 35K of the first chute member 35. The movable plate 50 is covered from above by a right part of the cover member 38. The supply tray 91 is configured to support the sheet SH, which is to be fed to the automatic conveyance mechanism 4, by the supply tray main body 92 and the movable plate 50.

As shown in FIG. 6, the movable plate 50 has shaft parts 50S, 50T of which shaft axes are a first shaft axis X1 extending in the front and rear direction. The front shaft part 50S is a circular cylinder shaft protruding forward from a front right corner portion of the movable plate 50. The front shaft part 50S is rotatably supported to the first side frame 9A. The rear shaft part 50T is a circular cylinder shaft protruding rearward from a rear right corner portion of the movable plate 50. The rear shaft part 50T is rotatably supported to the second side frame 9B. In this manner, the movable plate 50 is configured to be rotatable about the first shaft axis X1.

Although described later, when the first drive source M1 and a first rotation drive train 110 shown in FIGS. 6, 7 and the like are operated, the movable plate 50 rotates from a first position shown in FIGS. 2, 4 and 7 to a second position shown in FIGS. 5 and 8 in correspondence to reduction in the number of the sheets SH supported on the supply tray 91. The second position shown in FIG. 5 and the like is a position higher than the first position shown in FIG. 4 and the like.

As shown in FIGS. 1 and 4, two width regulation guides 94A, 94B are provided to be slidable in the front and rear direction on the supply tray main body 92. The front width regulation guide 94A and the rear width regulation guide 94B come close to each other or separate from each other, so that a plurality of types of sheets SH having different sizes and supported on the supply tray 91 are sandwiched in the front and rear direction. Accordingly, it is possible to positionally align the sheets SH having various sizes with reference to a central part of the supply tray 91 in the width direction.

As shown in FIGS. 4 and 5, the discharge tray 96 is provided at a right part of the base member 39. That is, the discharge tray 96 is provided to overlap the supply tray 91 at a position below the supply tray 91. To the discharge tray 96, the sheet SH of which an image has been read by the reading sensor 3S and which has been conveyed by the automatic conveyance mechanism 4 is discharged. An upper surface of the discharge tray 96 is configured as a sheet support surface 96A for supporting the discharged sheet SH.

The conveyance guide 30 configures a conveyance path for conveying the sheet SH from the supply tray 91 toward the discharge tray 96. Specifically, the conveyance guide 30 includes a first guide 31, a second guide 32 and a third guide 33.

The first guide 31 includes a part, which extends in the substantially horizontal direction of the conveyance surface 35G of the first chute member 35, and a part, which extends in the substantially horizontal direction of the guide surface 38G of the cover member 38. The first guide 31 is configured to guide leftward the sheet SH to be fed from the supply tray 91.

The second guide 32 includes a curved left end portion of the conveyance surface 35G of the first chute member 35, a curved left end portion of the guide surface 38G of the cover member 38, a curved left end portion of the conveyance surface 39G of the base member 39, and a curved left end portion of the guide surface 36G of the second chute member 36. The second guide 32 connects to the first guide 31 and is configured to change a conveying direction of the sheet SH from a leftward direction to a rightward direction.

The third guide 33 includes a downward sloped part of the conveyance surface 39G of the base member 39, a downward sloped part of the guide surface 36G of the second chute member 36 and the guide surface 36H of the second chute member 36. The third guide 33 connects to the second guide 32 and is configured to guide the sheet SH toward the discharge tray 96.

The automatic conveyance mechanism 4 includes a discharge unit 60 for discharging the sheet SH guided by the third guide 33 to the discharge tray 96 by a discharge guide 61. The discharge guide 61 has a conveyance surface 61G and a guide surface 61H. The conveyance surface 61G is located at the right of the guide convex part 8H of the main body part 8 and is sloped upward and rightward. The guide surface 61H is located at the right of the guide surface 36H of the second chute member 36. The guide surface 61H is sloped upward and rightward along the conveyance surface 61G. The discharge guide 61 has a discharge opening 69 for discharging the sheet SH to the discharge tray 96. The discharge opening 69 is opened between a right end portion of the conveyance surface 61G and a right end portion of the guide surface 61H.

As shown in FIG. 6, the discharge guide 61 of the discharge unit 60 is a substantially square tube-shaped member where a flat plate having the conveyance surface 61G formed thereon and a flat plate having the guide surface 61H formed thereon face each other in the upper and lower direction and front end edges and rear end edges of both the flat plates are connected by a pair of front and rear side plates. The discharge guide 61 has shaft parts 61S, 61T of which shaft axes are a third shaft axis X3 extending in the front and rear direction. The third shaft axis X3 is parallel with the first shaft axis X1.

The front shaft part 61S is a circular cylinder shaft protruding forward from front left corner portions of the conveyance surface 61G and the guide surface 61H. The front shaft part 61S is rotatably supported to the first side frame 9A and protrudes forward beyond the first side frame 9A.

The rear shaft part 61T is a circular cylinder shaft protruding rearward from rear left corner portions of the conveyance surface 61G and the guide surface 61H. The rear shaft part 61T is rotatably supported to the second side frame 9B and protrudes rearward beyond the second side frame 9B.

In this manner, the discharge guide 61 is configured to be rotatable about the third shaft axis X3. As shown in FIG. 4, a position of the third shaft axis X3 is set to overlap a conveyance path formed by the third guide 33 of the conveyance guide 30 and the discharge guide 61.

The discharge unit 60 includes a discharge roller 47 and a discharge pinch roller 48. The discharge roller 47 is located above the discharge opening 69. The discharge pinch roller 48 is located below the discharge opening 69. Although not shown, two sets of discharge rollers 47 and discharge pinch rollers 48 are arranged with intervals in the front and rear direction.

As shown in FIG. 6, the discharge roller 47 is fixed to a rotary shaft 47S of which a shaft axis is a second shaft axis X2 parallel with the third shaft axis X3. The rotary shaft 47S is rotatably supported by shaft support parts 61M, 61N provided at an upper surface-side of the discharge guide 61.

The front shaft support part 61M is configured to support the rotary shaft 47S at a position offset rearward with respect to a front right corner portion of the discharge guide 61. A front end portion of the rotary shaft 47S protrudes forward beyond the front shaft support part 61M. The rear shaft support part 61N is configured to support the rotary shaft 47S at a rear right corner portion of the discharge guide 61. A rear end portion of the rotary shaft 47S protrudes rearward beyond the discharge guide 61. In this manner, the discharge roller 47 is supported to the discharge guide 61 so as to be rotatable about the second shaft axis X2 extending in the front and rear direction.

Figure 7:
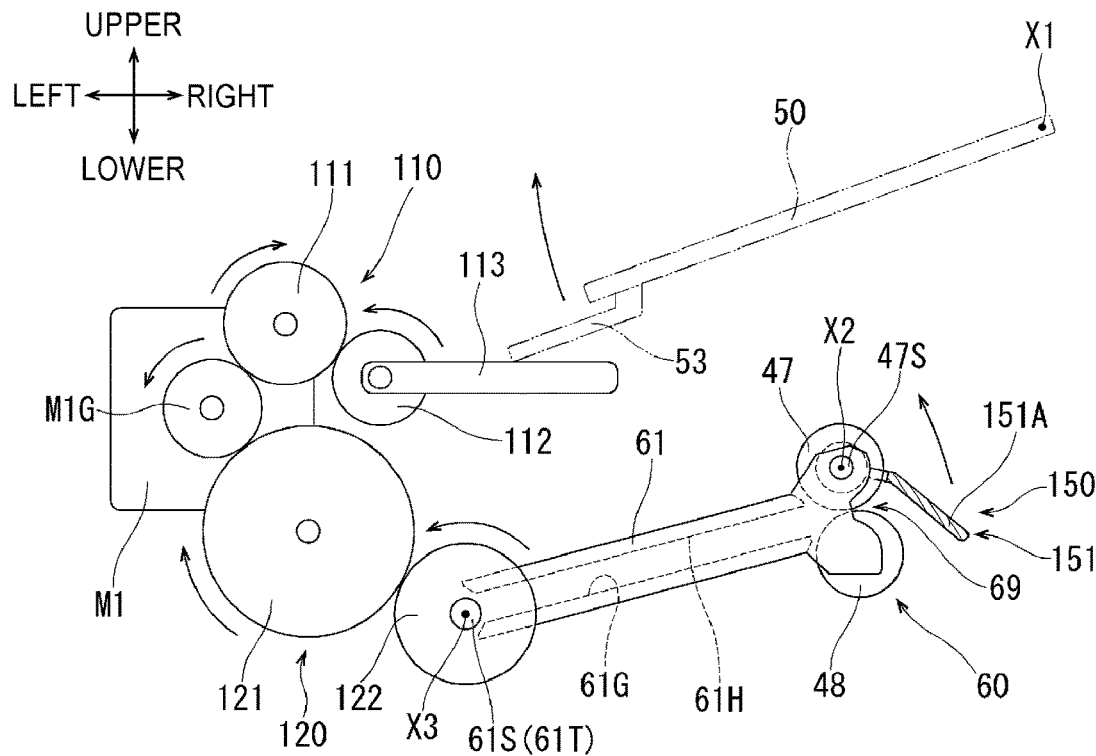
FIG. 7 is a schematic view illustrating a movable plate, a discharge unit, a first drive source, a second rotation drive train and the like, as seen from a direction of an arrow Y in FIG. 6, in which the movable plate is located at a first position and the discharge unit is located at a third position.

As shown in FIGS. 4 and 7, the discharge pinch roller 48 is rotatably supported to a right end portion of the discharge guide 61 and faces the discharge roller 47 from below. The conveyance surface 61G and the guide surface 61H of the discharge guide 61 are configured to guide the sheet SH toward a nip position between the discharge roller 47 and the discharge pinch roller 48.

Although described later, when the first drive source M1 and a second rotation drive train 120 shown in FIGS. 6, 7 and the like are operated, the discharge unit 60 rotates from a third position shown in FIGS. 2, 4 and 7 to a fourth position shown in FIGS. 5 and 8 in correspondence to reduction in the number of the sheets SH supported on the supply tray 91. The fourth position shown in FIG. 5 and the like is a position higher than the third position shown in FIG. 4 and the like.

As shown in FIG. 4, the automatic conveyance mechanism 4 includes a supply roller 41 for conveying the sheet SH along the conveyance guide 30, a separation roller 42, a retard roller 42A, a first conveyance roller 43, a first pinch roller 43P, a second conveyance roller 44, a second pinch roller 44P, the discharge roller 47 and the discharge pinch roller 48. The discharge roller 47 and the discharge pinch roller 48 are parts of the discharge unit 60.

As shown in FIG. 6, a rotary shaft 42S of the separation roller 42, a rotary shaft 43S of the first conveyance roller 43 and a rotary shaft 44S of the second conveyance roller 44 are rotatably supported to the first side frame 9A and the second side frame 9B. Rear end portions of the rotary shafts 42S, 43S, 44S protrude rearward beyond the second side frame 9B.

The automatic conveyance mechanism 4 includes a second drive source M2 and a conveyance drive train 130 for driving the supply roller 41, the separation roller 42, the first conveyance roller 43, the second conveyance roller 44 and the discharge roller 47. In the first illustrative embodiment, gear teeth formed on an outer peripheral surface of each of gears configuring the second drive source M2 and the conveyance drive train 130 are not shown in FIG. 6.

The second drive source M2 is a stepping motor. The conveyance drive train 130 includes drive force transmission members such as various gears, a pulley, a timing belt and the like. The second drive source M2 and the conveyance drive train 130 are provided to the second side frame 9B.

The conveyance drive train 130 is configured to transmit the drive force from the second drive source M2 to the rotary shaft 42S of the separation roller 42, the rotary shaft 43S of the first conveyance roller 43 and the rotary shaft 44S of the second conveyance roller 44, so as to rotate the separation roller 42, the first conveyance roller 43 and the second conveyance roller 44. Also, the conveyance drive train 130 is configured to transmit the drive force from the second drive source M2 to the rotary shaft 47S of the discharge roller 47, so as to rotate the discharge roller 47. Meanwhile, in FIG. 6, the conveyance-system components such as the separation roller 42 and the like are not shown.

As shown in FIG. 4, the separation roller 42 is provided at a position offset leftward from the connection part of the regulation surface 35K and conveyance surface 35G of the first chute member 35.

A holder 42F is rotatably supported to the rotary shaft 42S of the separation roller 42. The holder 42F protrudes rightward beyond the regulation surface 35K, with being spaced from the rotary shaft 42S.

The supply roller 41 is rotatably supported to a right end portion of the holder 42F. The supply roller 41 is provided at a position facing the movable plate 50 from above. The rotary shaft 42S and a transmission gear group (not shown) provided in the holder 42F are configured to transmit the drive force from the second drive source M2 to the supply roller 41, thereby rotating the supply roller 41 in the direction in which the sheet SH supported on the supply tray 91 is to be conveyed to the conveyance guide 30. The supply roller 41 can be displaced in the upper and lower direction, in association with rotation of the holder 42F.

The opening/closing part 9 is provided with a holder posture detection sensor 42J. The holder posture detection sensor 42J is configured to detect whether a posture of the holder 42F is an appropriate posture shown in FIGS. 4 and 5, and to transmit a detection result to the controller 7. In a state where the holder 42F is at the appropriate posture shown in FIGS. 4 and 5, a lower end of the supply roller 41 is substantially flush with the conveyance surface 35G of the first chute member 35. In this state, the supply roller 41 can favorably feed the uppermost sheet SH of the sheets SH supported on the supply tray 91 toward the conveyance surface 35G, i.e., toward between the separation roller 42 and the retard roller 42A.

The retard roller 42A is supported to the first chute member 35 at a position immediately below the separation roller 42, and is pressed toward the separation roller 42. When one sheet SH is nipped between the separation roller 42 and the retard roller 42A, rotation of the retard roller 42A is permitted by a torque limiter (not shown). On the other hand, when a plurality of sheets SH are nipped between the separation roller 42 and the retard roller 42A, the rotation of the retard roller 42A is stopped by the torque limiter (not shown). Accordingly, the retard roller 42A applies, to a sheet SH except the sheet SH in contact with the separation roller 42, a force of stopping conveyance of the sheet SH.

The first conveyance roller 43 is provided at a connection part of the first guide 31 and the second guide 32 so as to face the conveyance surface 35G of the first chute member 35 from above. The first pinch roller 43P is supported to the first chute member 35 and is pressed toward the first conveyance roller 43. The first conveyance roller 43 and the first pinch roller 43P are configured to nip the sheet SH separated one by one by the separation roller 42 and the retard roller 42A and to convey the same toward the second guide 32.

The second conveyance roller 44 is provided at a connection part of the second guide 32 and the third guide 33 so as to face the guide surface 36G of the second chute member 36 from below. The second pinch roller 44P is supported to the second chute member 36 and is pressed toward the second conveyance roller 44. The second conveyance roller 44 and the second pinch roller 44P are configured to nip the sheet SH conveyed by the first conveyance roller 43 and the first pinch roller 43P and to convey the sheet SH toward the reading surface 8B, i.e., toward the reading sensor 3S stopped at the stationary reading position.

The discharge roller 47 and the discharge pinch roller 48 are configured to nip the sheet SH passing above the reading surface 8B and guided by the discharge guide 61, and to discharge the same from the discharge opening 69 toward the discharge tray 96.

<Configurations of First Drive Source, First Rotation Drive Train and Second Rotation Drive Train>

As shown in FIGS. 6, 7 and the like, the automatic conveyance mechanism 4 includes the first drive source M1, the first rotation drive train 110 and the second rotation drive train 120 and is configured to perform rotating operations of the movable plate 50 and the discharge unit 60. The second rotation drive train 120 is an example of the second drive train. In the first illustrative embodiment, in FIGS. 6, 7 and the like, gear teeth formed on an outer peripheral surface of each of gears configuring the first drive source M1, the first rotation drive train 110 and the second rotation drive train 120 are not shown.

As shown in FIG. 4, the first drive source M1 is provided between the first guide 31 and the third guide 33. As shown in FIG. 6, the first drive source M1 is attached to a rear surface of the first side frame 9A. A drive shaft of the first drive source M1 protrudes forward beyond the first side frame 9A, and the drive gear M1G is fixed to the drive shaft. In the first illustrative embodiment, the first drive source M1 is a stepping motor. The first drive source M1 is configured to generate a drive force to rotate the drive gear M1G in the clockwise and counterclockwise directions in FIGS. 7 and 8 under control of the controller 7.

Figure 8:
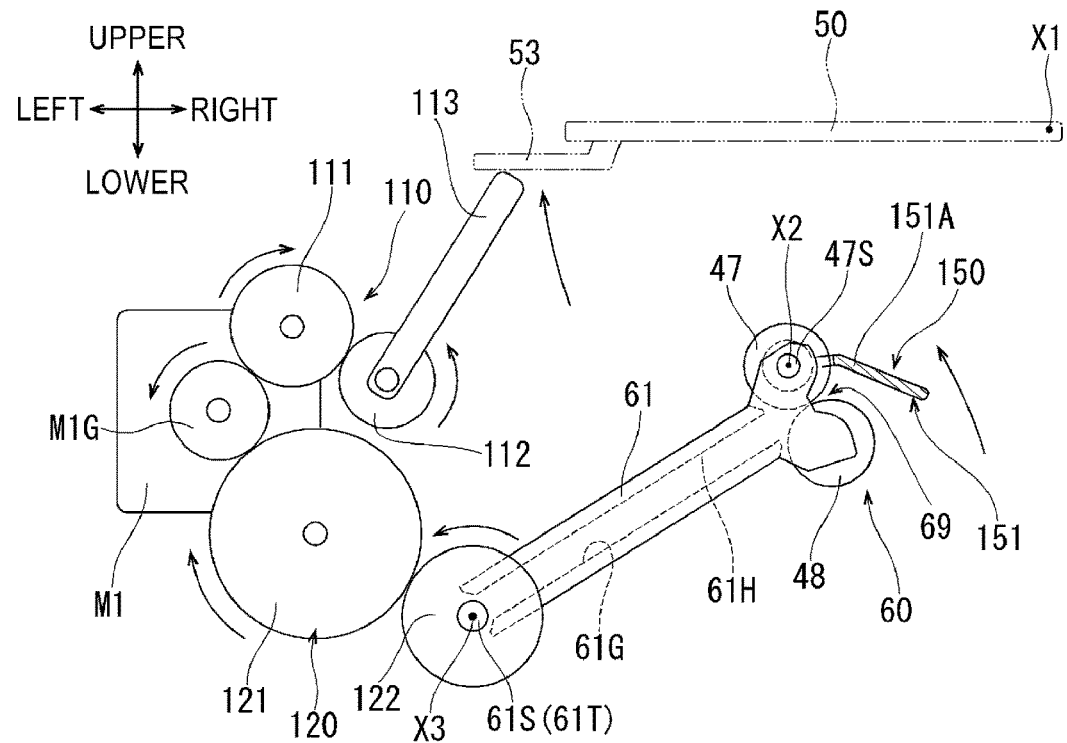
FIG. 8 is a schematic view similar to FIG. 7, illustrating a state where the movable plate is moved to a second position and a discharge unit is moved to a fourth position.

A plurality of arrows shown in FIGS. 7 and 8 indicate rotating directions when the drive gear M1G rotates in the counterclockwise direction in FIGS. 7 and 8. On the other hand, when the drive gear M1G rotates in the clockwise direction in FIGS. 7 and 8, the rotating directions are opposite to the respective arrows shown in FIGS. 7 and 8.

As shown in FIGS. 6 and 7, the first rotation drive train 110 and the second rotation drive train 120 are provided in front of the first side frame 9A and are supported to the plurality of shaft parts protruding forward from the first side frame 9A.

The first rotation drive train 110 includes a first gear 111, a gear 112 and an arm 113. The first gear 111 is located at the right and upper of the drive gear M1G and is in mesh with the drive gear M1G. The gear 112 is located at the right and lower of the first gear 111 and is in mesh with the first gear 111. The arm 113 is fixed to a front surface of the gear 112 and protrudes rightward.

The movable plate 50 has a movement receiving part 53. The movement receiving part 53 protrudes forward from a front left corner portion of a backside of the movable plate 50, protrudes leftward with being bent, and is in contact with a right end portion of the arm 113 from above.

The second rotation drive train 120 includes a second gear 121 and a gear 122. The second gear 121 is located at the right and lower of the drive gear M1G and is in mesh with the drive gear M1G. The gear 122 is fixed to the front shaft part 61S of the discharge guide 61 so as to be integrally rotatable. The gear 122 is located at the right and lower of the second gear 121 and is in mesh with the second gear 121. When the gear 122 rotates, the discharge guide 61 and the discharge roller 47 and discharge pinch roller 48 supported to the discharge guide 61 rotate integrally with the gear 122.

The first rotation drive train 110 and the second rotation drive train 120 are branched between the first drive source M1 and the first gear 111 and second gear 121, i.e., are provided in parallel with each other at the drive gear M1G, which is a branch point. In the first illustrative embodiment, the respective gears such as the first gear 111 and the second gear 121 configuring the first rotation drive train 110 and the second rotation drive train 120 are general gears such as a spur gear and a helical gear.

Subsequently, operations of the first rotation drive train 110 are described. When the first drive source M1 rotates the drive gear M1G in the counterclockwise direction in FIG. 7, the first rotation drive train 110 including the first gear 111 transmits the drive force from the first drive source M1 to the movable plate 50, so as to rotate the movable plate 50 from the first position shown in FIG. 4 and the like to the second position shown in FIG. 5 and the like.

Specifically, the first gear 111, which is in mesh with the drive gear M1G, of the first rotation drive train 110 rotates in the clockwise direction in FIG. 7 and the gear 112 in mesh with the first gear 111 rotates in the counterclockwise direction in FIG. 7, so that the right end portion of the arm 113 fixed to the gear 112 move upward. As a result, as shown in FIG. 8, the movement receiving part 53 of the movable plate 50 is pushed up. Therefore, the movable plate 50 rotates about the first shaft axis X1 so as to displace upward the left end portion thereof and moves to the second position shown in FIG. 5 and the like.

Also, when the first drive source M1 rotates the drive gear M1G in the clockwise direction in FIG. 8, the first rotation drive train 110 including the first gear 111 operates in a reverse manner as the above operation, so that the right end portion of the arm 113 moves downward. As a result, as shown in FIG. 7, the movement receiving part 53 of the movable plate 50 also moves downward. Therefore, the movable plate 50 rotates about the first shaft axis X1 so as to displace downward the left end portion thereof and moves to the first position shown in FIG. 4 and the like.

Subsequently, operations of the second rotation drive train 120 are described. When the first drive source M1 rotates the drive gear M1G in the counterclockwise direction in FIG. 7, the second rotation drive train 120 including the second gear 121 transmits the drive force from the first drive source M1 to the discharge unit 60, so as to rotate the discharge unit 60 from the third position shown in FIG. 4 and the like to the fourth position shown in FIG. 5 and the like.

Specifically, the second gear 121, which is in mesh with the drive gear M1G, of the second rotation drive train 120 rotates in the clockwise direction in FIG. 7 and the gear 122 in mesh with the second gear 121 rotates in the counterclockwise direction in FIG. 7. As a result, as shown in FIG. 8, the discharge guide 61 rotates upward integrally with the gear 122. Therefore, the discharge unit 60 rotates about the third shaft axis X3 so as to displace upward the discharge opening 69 and moves to the fourth position shown in FIG. 5 and the like.

When the first drive source M1 rotates the drive gear M1G in the clockwise direction in FIG. 8, the second rotation drive train 120 including the second gear 121 operates in a reverse manner as the above operation, so that the gear 122 rotates in the clockwise direction in FIG. 8. As a result, as shown in FIG. 7, the discharge guide 61 rotates downward integrally with the gear 122. Therefore, the discharge unit 60 rotates about the third shaft axis X3 so as to displace downward the discharge opening 69 and moves to the third position shown in FIG. 4 and the like.

As shown in FIG. 4, in the state where the movable plate 50 is located at the first position, the left end portion of the movable plate 50 is located at a position facing a lower end portion of the regulation surface 35K of the first chute member 35, and an inclination angle of the upper surface of the movable plate 50 is substantially the same as an inclination angle of the upper surface of the supply tray main body 92. In this state, the supply tray 91 can support the maximum number of sheets SH. When the movable plate 50 is located at the first position and the supply roller 41 is contacted to the uppermost sheet SH of the maximum number of sheets SH, the holder 42F is at an appropriate posture shown in FIG. 4.

As shown in FIG. 5, in the state where the movable plate 50 is located at the second position, the left end portion of the movable plate 50 is located at a position facing an upper end portion of the regulation surface 35K of the first chute member 35, and the upper surface of the movable plate 50 extends in the substantially horizontal direction at a height that is substantially flush with the conveyance surface 35G of the first chute member 35. In this state, the supply tray 91 supports one to several sheets SH. When the movable plate 50 is located at the second position and the supply roller 41 is contacted to the uppermost sheet SH of one to several sheets SH, the holder 42F is at an appropriate posture shown in FIG. 5.

In an image reading operation execution program of FIG. 13, which will be described later, when it is determined based on the detection signal of the holder posture detection sensor 42J that the posture of the holder 42F is lowered from the appropriate posture shown in FIGS. 4 and 5 beyond an allowable range, the controller 7 operates the first drive source M1 to rotate the movable plate 50 from the first position shown in FIG. 4 and the like toward the second position shown in FIG. 5 and the like by a predetermined amount, so as to control the holder 42F to keep the appropriate posture shown in FIGS. 4 and 5. At this time, the controller 7 may finely change the rotating posture of the arm 113 by controlling the rotating angle of the first drive source M1 (stepping motor), so as to positionally determine the movable plate 50 at a desired rotating posture with high precision.

When the controller 7 operates the first drive source M1 to rotate the movable plate 50 by the predetermined amount, the drive force from the first drive source M1 is also transmitted to the discharge unit 60 by the second rotation drive train 120. Accordingly, the discharge unit 60 rotates from the third position shown in FIG. 4 and the like toward the fourth position shown in FIG. 5 and the like by a predetermined amount in synchronization with the rotation of the movable plate 50. The image reading apparatus 1 can be size-reduced in the upper and lower direction by the configuration where the discharge unit 60 rotates in correspondence to the rotation of the movable plate 50 of the supply tray 91.

As shown in FIG. 4, in the state where the discharge unit 60 is located at the third position, the discharge opening 69, the discharge roller 47 and the discharge pinch roller 48 are located at positions close to the sheet support surface 96A of the discharge tray 96. This state of the discharge unit 60 corresponds to a case where the number of sheets SH supported on the sheet support surface 96A of the discharge tray 96 is small.

As shown in FIG. 5, in the state where the discharge unit 60 is located at the fourth position, the discharge opening 69, the discharge roller 47 and the discharge pinch roller 48 are located at positions spaced upward from the sheet support surface 96A of the discharge tray 96. This state of the discharge unit 60 corresponds to a case where the maximum number of sheets SH is supported on the sheet support surface 96A of the discharge tray 96. That is, in this state, the discharge opening 69 of the discharge unit 60 is sufficiently spaced upward from the uppermost sheet SH of the maximum number of sheets SH supported on the sheet support surface 96A.

<Configuration of Sheet Detection Unit>

Figure 10:
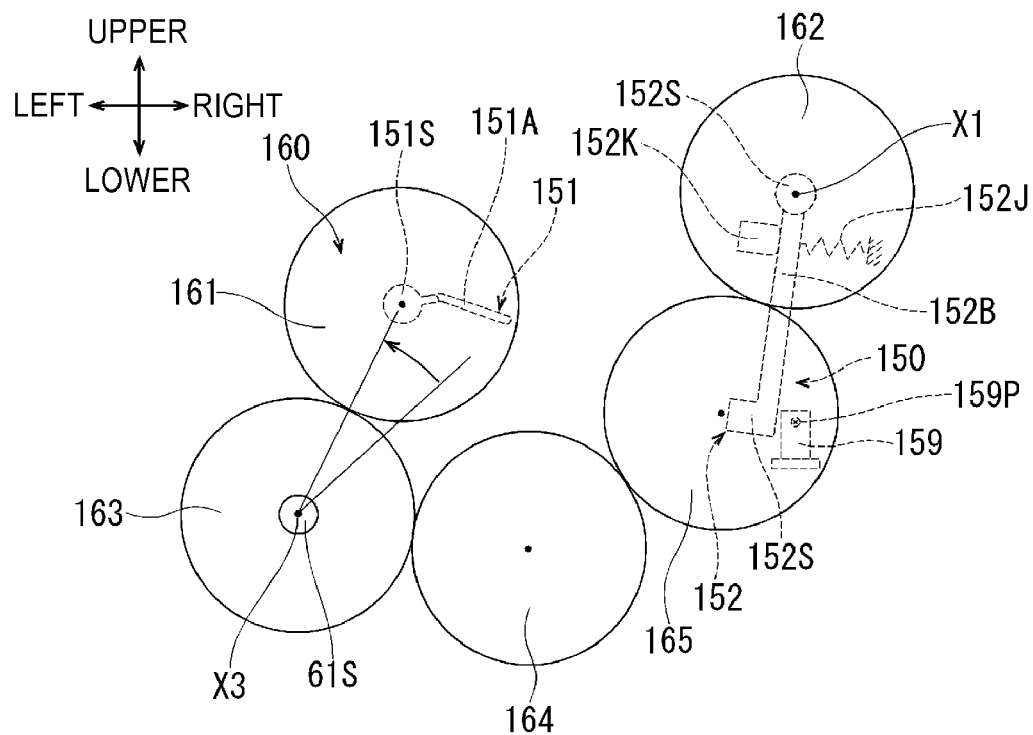
FIG. 10 is a schematic view similar to FIG. 9, illustrating a state where the first actuator and the first gear have rotated.
Figure 11:
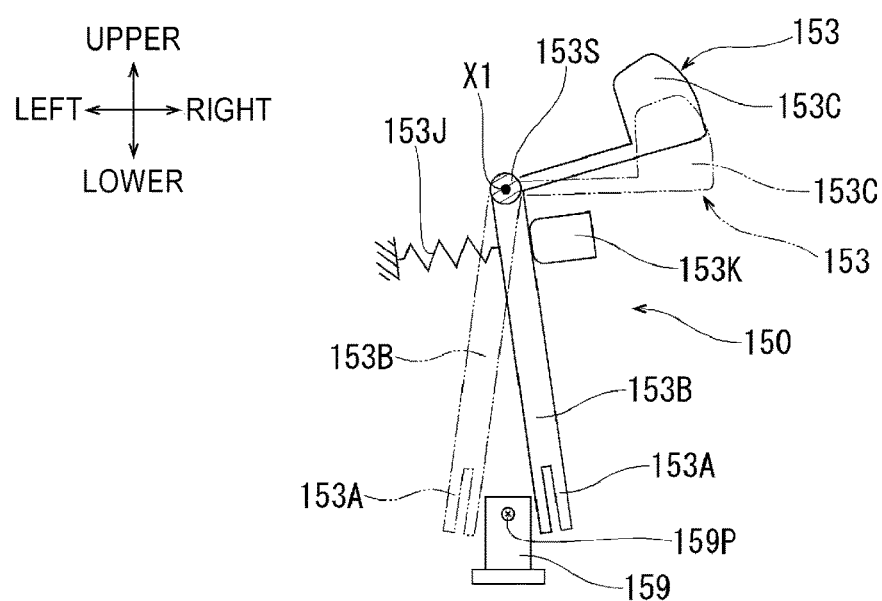
FIG. 11 is a schematic view illustrating the sensor, a third actuator and the like of the sheet detection unit, as seen from a direction of an arrow W in FIG. 6.
Figure 12:
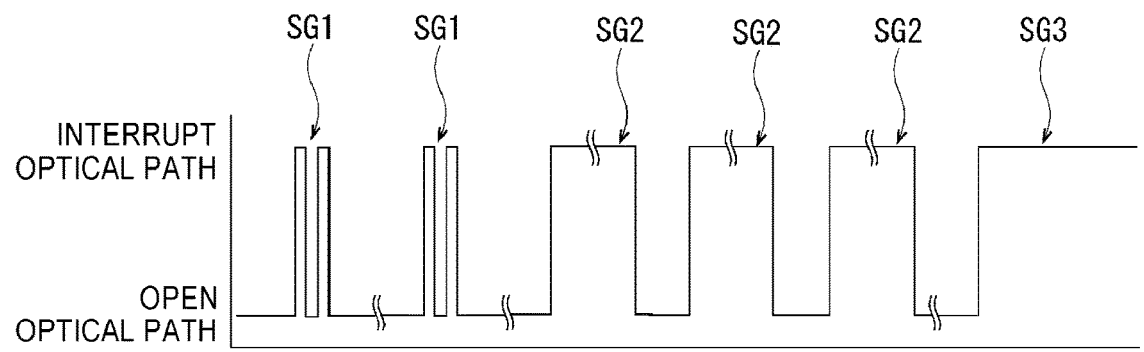
FIG. 12 is a graph illustrating detection signals of the sensor.

As shown in FIGS. 4 to 6 and 9 to 11, the automatic conveyance mechanism 4 includes a sheet detection unit 150. The sheet detection unit 150 includes a sensor 159, a first actuator 151, a second actuator 152, a third actuator 153 and a first drive train 160. The controller 7 is configured to determine whether the sheets SH supported on the discharge tray 96 are lower than a predetermined height H1, whether there is a sheet SH passing through the discharge opening 69 and whether there is a sheet SH supported on the supply tray 91, as shown in FIGS. 13 to 15, based on detection signals that are output by the sensor 159 in correspondence to rotations of the first actuator 151, the second actuator 152 and the third actuator 153, as shown in FIG. 12.

In the first illustrative embodiment, as shown in FIGS. 4 and 5, the first actuator 151 is provided to the discharge unit 60, so that the predetermined height H1 increases in correspondence to a posture of the discharge unit 60 when the discharge unit 60 moves toward the fourth position shown in FIG. 5 and the like. The predetermined height H1 becomes a full-load height in a state where the discharge unit 60 is located at the fourth position shown in FIG. 5 and the like, i.e., at the upper limit. The predetermined height H1 is set to a height at which the sheet SH, which is to be discharged from the discharge opening 69 of the discharge unit 60 at a next image reading operation, is to be interrupted, at a posture of the discharge unit 60 when the discharge unit 60 moves toward the fourth position shown in FIG. 5 and the like.

As shown in FIGS. 4 to 6, the sensor 159 is fixed to a position in front of the first side frame 9A and immediately below the first shaft axis X1 in the opening/closing part 9. The sensor 159 shown with the dashed-two dotted line in FIGS. 4 and 5 is located at the front of the drawing sheet, as compared to the discharge tray 96. The sensor 159 has a constant relative positional relationship with the discharge tray 96.

Figure 9:
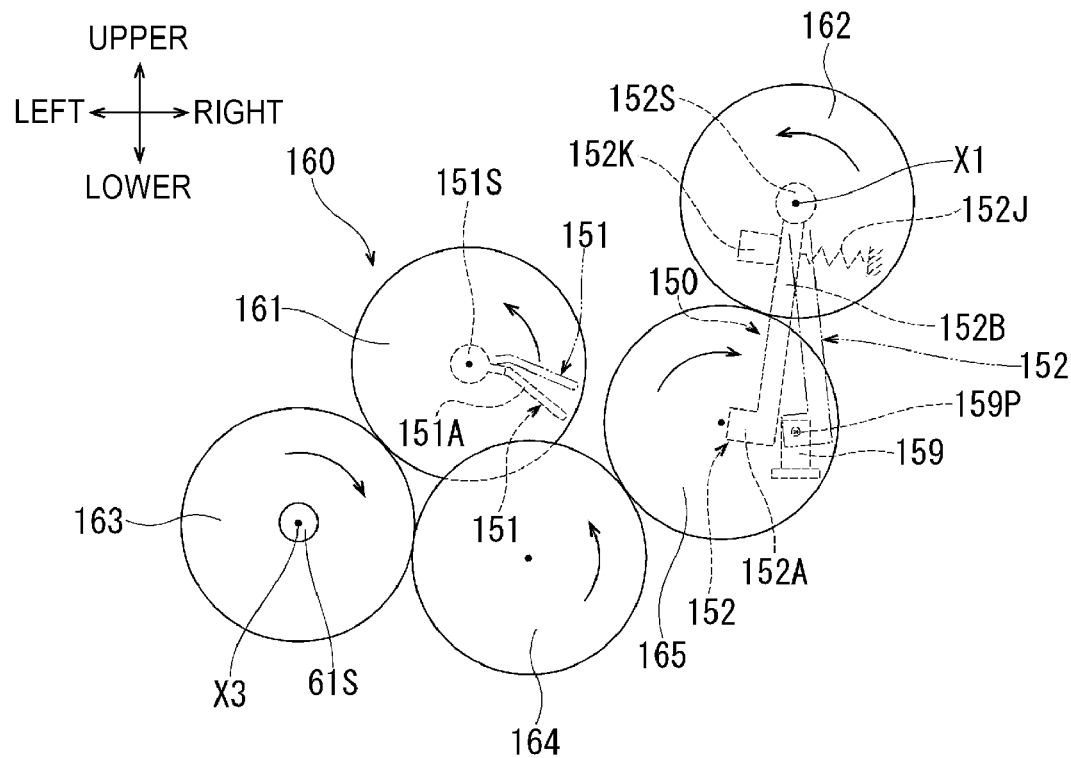
FIG. 9 is a schematic view illustrating a sensor, a first actuator, a second actuator, a first drive train and the like of a sheet detection unit, as seen from a direction of an arrow V in FIG. 6.

As shown in FIG. 3, the sensor 159 is connected to the controller 7. In the first illustrative embodiment, the sensor 159 is a photo interrupter. As shown in FIGS. 9 to 11, an optical path 159P from a light emitting part to a light receiving part is opened or interrupted, so that the sensor 159 outputs an ON/OFF signal exemplified in FIG. 12 to the controller 7, as a detection signal.

As shown in FIGS. 4 and 6, the first actuator 151 is rotatably supported to the rotary shaft 47S of the discharge roller 47, so that it is provided to the discharge unit 60. Specifically, as shown in FIG. 6, the first actuator 151 has supported parts 151D, 151E, a connection part 151C, a transmission shaft 151S and a contact part 151A.

The supported part 151D is rotatably supported to the rotary shaft 47S of the discharge roller 47 at an intermediate part of the discharge guide 61 in the front and rear direction. The supported part 151E is rotatably supported to the front end portion of the rotary shaft 47S at a position in front of the front shaft support part 61M.

The connection part 151C interconnects a right end portion of the supported part 151D and a right end portion of the supported part 151E at a position spaced rightward from the second shaft axis X2 so as to avoid the discharge roller 47. The transmission shaft 151S is a circular cylinder shaft of which a shaft axis is the second shaft axis X2. A rear end portion of the transmission shaft 151S is connected to the supported part 151E. A front end portion of the transmission shaft 151S protrudes forward beyond the first side frame 9A.

The contact part 151A has a substantially plate-shaped piece connected to the right end portion of the supported part 151D. As shown in FIGS. 4 and 5, the contact part 151A more extends rightward than the discharge roller 47, is sloped downward to traverse the discharge opening 96, and is positioned above the sheet support surface 96A of the discharge tray 96.

By the above configuration, the first actuator 151 can rotate about the second shaft axis X2, independently from the rotary shaft 47S of the discharge roller 47. As shown in FIG. 5, the contact part 151A is contacted to the sheet SH supported on the sheet support surface 96A from above, so that the first actuator 151 rotates upward about the second shaft axis X2. Also, when the contact part 151A traversing the discharge opening 96 is contacted to the sheet SH passing through the discharge opening 69, the first actuator 151 rotates upward about the second shaft axis X2. Accordingly, the contact part 151A moves up to a position at which it does not interfere with the sheet SH passing through the discharge opening 69.

The discharge unit 60 rotates, so that a relative positional relationship between the second shaft axis X2 and the discharge tray 96 changes. Therefore, a relative positional relationship between the first actuator 151 and the discharge tray 96 also changes such that the first actuator is spaced upward from the sheet support surface 96A of the discharge tray 96 as the discharge unit 60 rotates.

The rotation of the first actuator 151 is an example of the movement of the first actuator. That is, the movement of the first actuator includes a posture change where only an angle changes. The same applies to the movement of the second actuator and the movement of the third actuator.

As shown in FIG. 6, a shaft support part 9M having a substantially rectangular column shape is provided at a position in front of the sensor 159 in the opening/closing part 9. The second actuator 152 has a transmission shaft 152S, a rod-shaped part 152B and a detection target part 152A. The transmission shaft 152S is supported to be rotatable about the first shaft axis X1 by the shaft support part 9M. A front end portion of the transmission shaft 152S more protrudes forward than the shaft support part 9M. A rear end portion of the transmission shaft 152S more protrudes rearward than the shaft support part 9M and is positioned immediately above the sensor 159.

As shown in FIGS. 6 and 9, the rod-shaped part 152B is connected to the rear end portion of the transmission shaft 152S and is configured to be rotatable about the first shaft axis X1 of which the relative positional relationship with the discharge tray 96 is constant. The rod-shaped part 152B extends downward in a substantial rod shape so as to be distant from the first shaft axis X1. As shown in FIG. 9, a lower end portion of the rod-shaped part 152B includes the detection target part 152A having a substantially rectangular plate shape.

As shown with a broken line in FIG. 9, the rod-shaped part 152B is urged so as to rotate about the first shaft axis X1 in the clockwise direction of FIG. 9 by an urging spring 152J and the rod-shaped part 152B is stopped by a stopper 152K, so that the second actuator 152 is kept at a position at which the detection target part 152A opens the optical path 159P of the sensor 159. As shown with a dashed-two dotted line in FIG. 9, the second actuator 152 rotates about the first shaft axis X1 in the counterclockwise direction of FIG. 9 against the urging spring 152J, so that the detection target part 152A interrupts the optical path 159P of the sensor 159. In the meantime, the urging spring 152J and the stopper 152K are mounted to an internal frame (not shown).

As shown in FIGS. 6 and 9, the first drive train 160 is provided so as to rotate the second actuator 152 in conjunction with the rotation of the first actuator 151 and includes a first gear 161, a gear 163, a gear 164, a gear 165 and a second gear 162. The gear 163 is an example of the rotary member. Meanwhile, in the first illustrative embodiment, gear teeth formed on an outer peripheral surface of each of the gears configuring the first drive train 160 are not shown in FIGS. 6, 9 and the like.

The first gear 161 is fixed to the front end portion of the transmission shaft 151S of the first actuator 151 and is configured to rotate about the second shaft axis X2 together with the first actuator 151.

The gear 163 is inserted in the front shaft part 61S of the discharge guide 61 and is configured to be rotatable about the third shaft axis X3, independently from the discharge guide 61. The gear 163 is located at the left and lower of the first gear 161 and is in mesh with the first gear 161.

The gear 164 and the gear 165 are supported to a plurality of shaft parts protruding forward from the first side frame 9A. The gear 164 is located at the right and lower of the gear 163 and is in mesh with the gear 163. The gear 165 is located at the right and upper of the gear 164 and is mesh with the gear 164.

The second gear 162 is fixed to the front end portion of the transmission shaft 152S of the second actuator 152 and is configured to rotate about the first shaft axis X1 together with the second actuator 152. The second gear 162 is located at the right and upper of the gear 165 and is in mesh with the gear 165.

When the first actuator 151 rotates about the second shaft axis X2, the first gear 161 of the first drive train 160 rotates together with the first actuator 151. The gear 163 is applied with a drive force from the first gear 161 and thus rotates independently from the front shaft part 61S of the discharge guide 61. The second gear 162 is applied with a drive force from the gear 163 via the gears 164, 165 and thus rotates.

That is, the first drive train 160 is configured to couple the first actuator 151 and the second actuator 152 each other via the gear 163 and is independent from the second rotation drive train 120.

As shown in FIG. 10, even when the second shaft axis X2 rotates in conjunction with the rotation of the discharge unit 60, the state where the first drive train 160 couples the first actuator 151 and the second actuator 152 each other via the gear 163 is kept.

In the first illustrative embodiment, the first gear 161, the gear 163, the gear 164, the gear 165 and the second gear 162 are gears having the same diameter and the same number of teeth. Therefore, the first drive train 160 synchronizes the second actuator 152 with the first actuator 15 such that a rotating angle of the first actuator 151 coincides with a rotating angle of the second actuator 152.

As shown with a rotating direction in FIG. 9, when the contact part 151A is contacted to the sheet SH and the first actuator 151 rotates upward about the second shaft axis X2, i.e., when the contact part 151A rotates from a position shown with a broken line in FIG. 9 toward a position with a dashed-two dotted line, the second gear 162 rotates in the counterclockwise direction in FIG. 9. As a result, the detection target part 152A of the second actuator 152 interrupts the optical path 159P of the sensor 159, as shown with the dashed-two dotted line in FIG. 9. On the other hand, when the contact part 151A separates from the sheet SH and the first actuator 151 rotates downward about the second shaft axis X2, i.e., when the contact part 151A rotates from the position shown with the dashed-two dotted line in FIG. 9 toward the position with the broken line, the second gear 162 rotates in the clockwise direction in FIG. 9. As a result, the detection target part 152A of the second actuator 152 opens the optical path 159P of the sensor 159, as shown with the broken line in FIG. 9.

That is, the sensor 159 is configured to detect the rotation of the first actuator 151 by an ON/OFF signal, which is output as the detection target part 152A of the second actuator 152 opens or interrupts the optical path 159P of the sensor 159, and to output a detection signal based on the detection result to the controller 7.

As shown in FIGS. 4, 6 and 11, the third actuator 153 has a transmission shaft 153S, a contact part 153C, a rod-shaped part 153B and a detection target part 153A. As shown in FIG. 6, the movable plate 50 has a concave part 50M. The concave part 50M is concave leftward from an intermediate part in the front and rear direction of a right end edge of the movable plate 50.

The movable plate 50 has a through-hole penetrating from the front shaft part 50S to the concave part 50M of the movable plate 50 in the front and rear direction, and the transmission shaft 153S is inserted in the through-hole. The transmission shaft 153S is configured to be rotatable about the first shaft axis X1, independently from the movable plate 50. A front end portion of the transmission shaft 153S is located immediately above the sensor 159 and faces the rear end portion of the transmission shaft 152S of the second actuator 152. A rear end portion of the transmission shaft 153S protrudes to the concave part 50M of the movable plate 50.

As shown in FIGS. 4 and 6, the contact part 153C is connected to the rear end portion of the transmission shaft 153S and is configured to be rotatable about the first shaft axis X1. The contact part 153C extends rightward away from the first shaft axis X1 and protrudes upward in a substantially trapezoidal shape. A position of the supply tray main body 92 corresponding to the contact part 153C has a rectangular hole 92H. A part of the contact part 153C passes through the rectangular hole 92H and more protrudes upward than the supply tray main body 92.

As shown in FIGS. 6 and 11, the rod-shaped part 153B is connected to the front end portion of the transmission shaft 153S and is configured to be rotatable about the first shaft axis X1. The rod-shaped part 153B extends downward in a substantial rod shape away from the first shaft axis X1 at a rear position of the rod-shaped part 152B of the second actuator 152. As shown in FIG. 11, a lower end portion of the rod-shaped part 153B has a detection target part 153A of a branched shape having two branches extending in parallel with each other.

The rod-shaped part 153B is urged so as to rotate about the first shaft axis X1 in the counterclockwise direction of FIG. 11 by an urging spring 153J and the rod-shaped part 153B is stopped by a stopper 153K, so that the third actuator 153 is kept at a position at which a part of the contact part 153C passes through the rectangular hole 92H and more protrudes upward than the supply tray main body 92, as shown with a solid line in FIG. 4 and the like. As shown with a solid line in FIG. 11, the detection target part 153A is kept at a position at which it is spaced rightward with respect to the optical path 159P of the sensor 159 and opens the optical path 159P. In the meantime, the urging spring 153J and the stopper 153K are mounted to the internal frame (not shown).

The sheet SH is supported on the supply tray 91, so that the third actuator 153 rotates about the first shaft axis X1 in the clockwise direction of FIG. 11 against the urging spring 153J and a part of the contact part 153C retreats into the rectangular hole 92H, as shown with the dashed-two dotted line in FIG. 11. At the same time, the detection target part 153A moves leftward, passes the optical path 159P of the sensor 159 and is kept at the position at which it is spaced leftward with respect to the optical path 159P and opens the optical path 159P.

Then, when there is no sheet SH supported on the supply tray 91, the third actuator 153 is urged by the urging spring 153J and rotates about the first shaft axis X1 in the counterclockwise direction of FIG. 11 and a part of the contact part 153C passes through the rectangular hole 92H and returns to a position at which it more protrudes upward than the supply tray main body 92, as shown with the solid line in FIG. 11. At the same time, the detection target part 153A moves rightward, passes the optical path 159P of the sensor 159 and returns to the position at which it is spaced rightward with respect to the optical path 159P and opens the optical path 159P.

As shown in FIG. 12, when the detection target part 153A of the third actuator 153 moves leftward and passes the optical path 159P of the sensor 159, the sensor 159 outputs a signal SG1 having two short pulses in series with a narrow interval to the controller 7, as the detection signal. When the detection target part 153A moves rightward and passes the optical path 159P of the sensor 159, the sensor 159 also outputs the signal SG1 having two short pulses in series with a narrow interval to the controller 7, as the detection signal.

Also, in conjunction with the rotation of the first actuator 151, which is caused when the contact part 151A is contacted to the sheet SH passing through the discharge opening 69, the sheet SH is then discharged to the discharge tray 96 and the contact part 151A thus separates from the sheet SH, the detection target part 152A of the second actuator 152 interrupts the optical path 159P of the sensor 159 for predetermined time. At this time, the sensor 159 outputs a signal SG2, which becomes ON for predetermined time, to the controller 7, as the detection signal. When a plurality of the sheets SH sequentially passes through the discharge opening 69, the sensor 159 repetitively outputs the detection signal SG2 to the controller 7 in correspondence to each sheet SH.

As shown in FIG. 6, in conjunction with the rotation of the first actuator 151, which is caused when the contact part 151A is contacted to the sheets SH from above, which are supported on the discharge tray 96 by a predetermined height H1, the detection target part 152A of the second actuator 152 continues to interrupt the optical path 159P of the sensor 159. At this time, the sensor 159 outputs a signal SG3, which continuously becomes ON, to the controller 7, as the detection signal.

Figure 13:
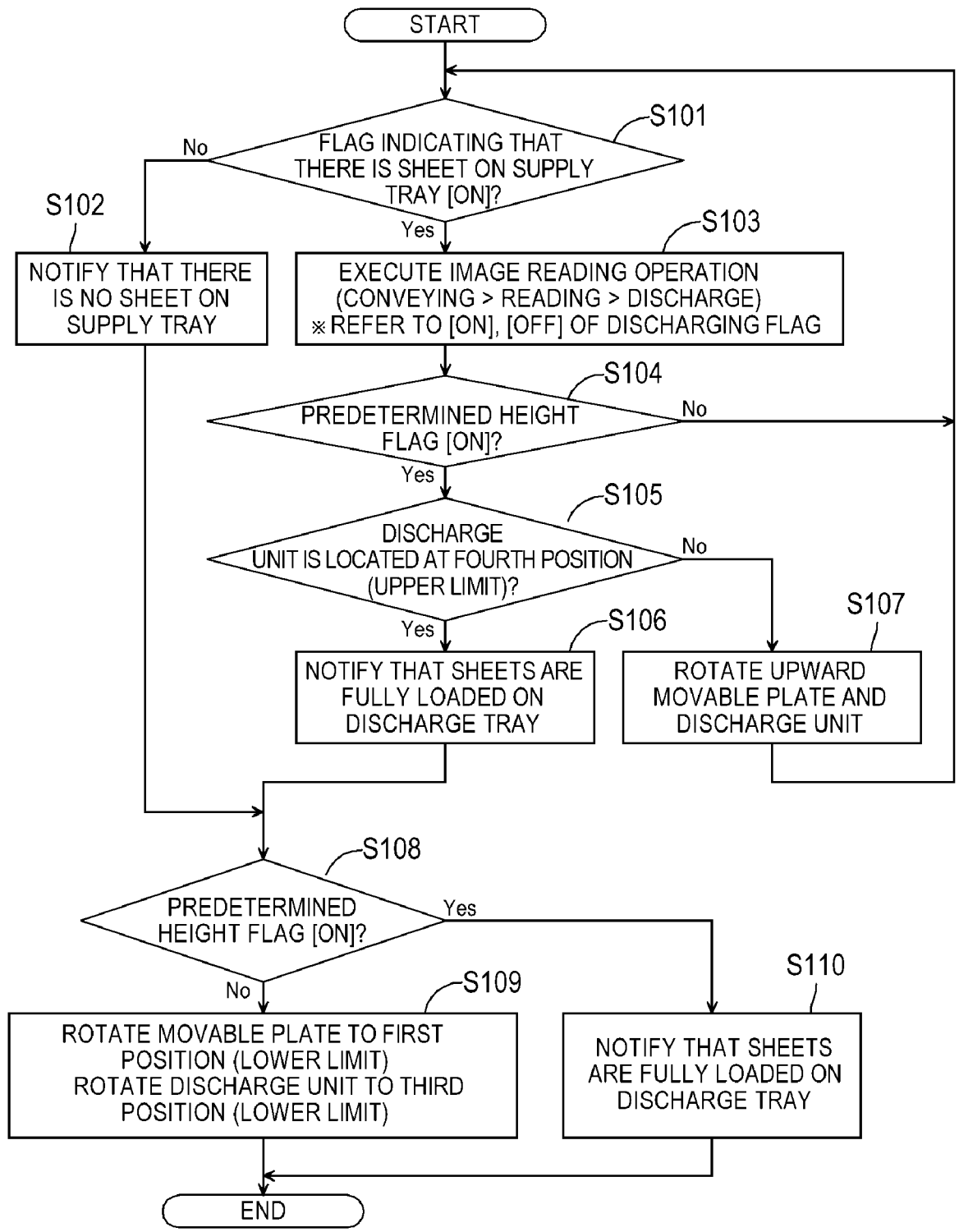
FIG. 13 is a flowchart illustrating image reading operation execution program.
Figure 14:
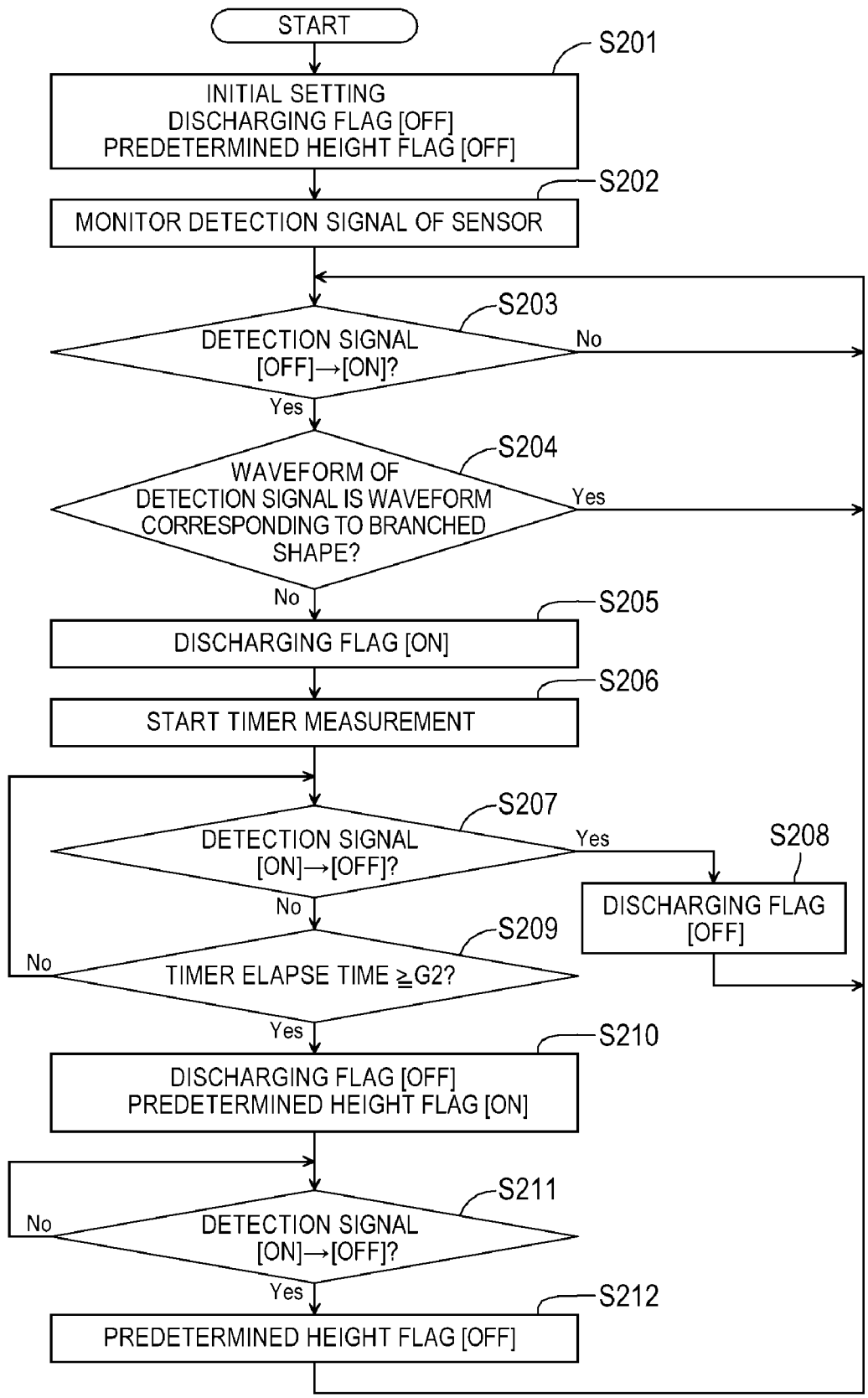
FIG. 14 is a flowchart illustrating an ON/OFF switching program of a discharging flag and a predetermined height flag.
Figure 15:
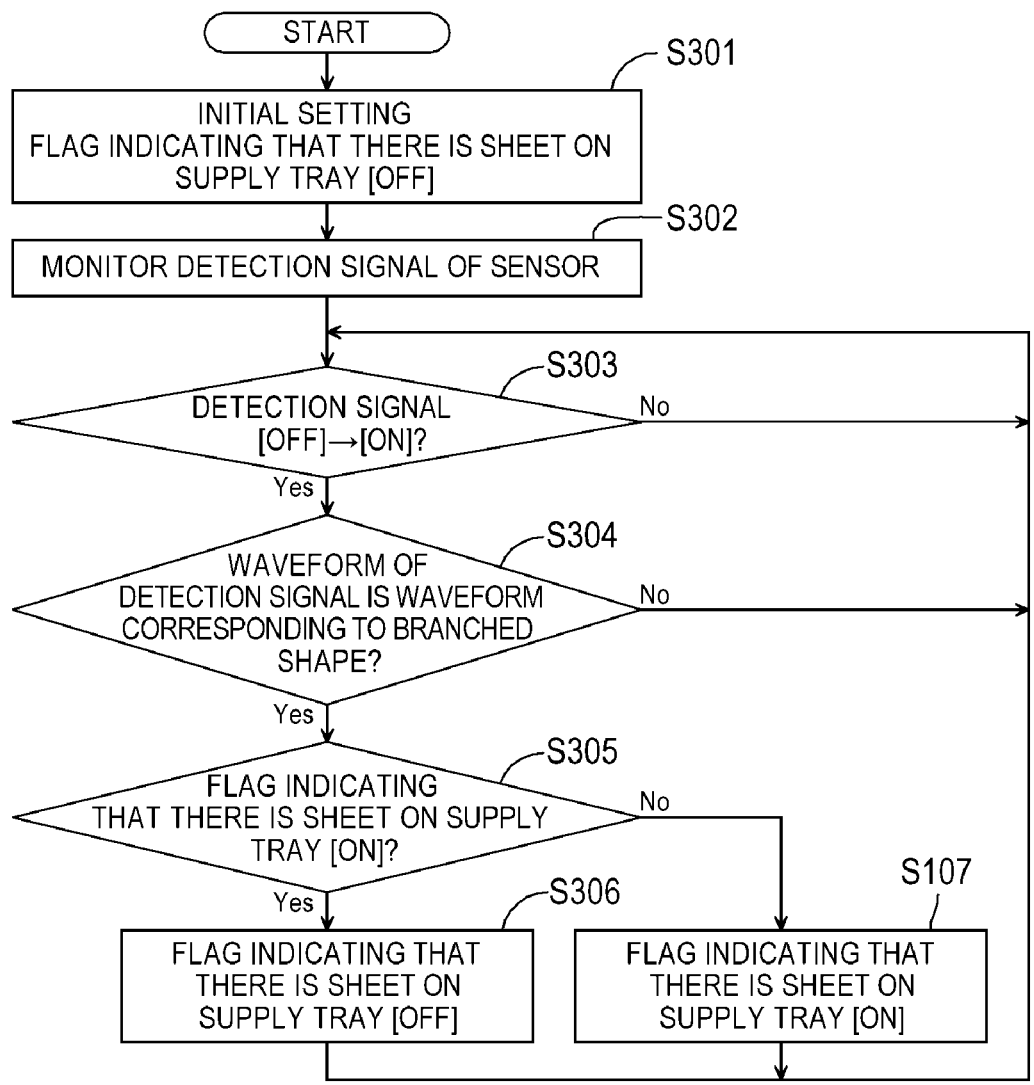
FIG. 15 is a flowchart illustrating an ON/OFF switching program of a flag indicating that there is a sheet on a supply tray.

In order to acquire information for executing the image reading operation execution program shown in FIG. 13 from the detection signals SG1, SG2, SG3 of the sensor 159, the controller 7 executes an ON/OFF switching program of a discharging flag and a predetermined height flag shown in FIG. 14 and an ON/OFF switching program of a flag indicating that there is a sheet on the supply tray shown in FIG. 15 in a parallel processing manner after the image reading apparatus 1 is activated and continues the parallel processing until a power supply of the image reading apparatus 1 becomes off.

When the ON/OFF switching program of the discharging flag and the predetermined height flag shown in FIG. 14 starts, the controller 7 initially sets a discharging flag to OFF and a predetermined height flag to OFF, in step S201.

Then, in step S202, the controller 7 starts to monitor the detection signal of the sensor 159. The controller 7 continues to monitor the detection signal of the sensor 159 until the power supply of the image reading apparatus 1 becomes off.

Then, in step S203, the controller 7 determines whether the detection signal of the sensor 159 is switched from OFF to ON. When a determination result in step S203 is "No", the controller 7 repetitively executes the processing of step S203. On the other hand, when a determination result in step S203 is "Yes", the controller 7 proceeds to step S204.

When the controller 7 proceeds to step S204, the controller 7 determines whether the detection signal of the sensor 159 is a waveform corresponding to the branched shape of the detection target part 153A of the third actuator 153. When the detection signal of the sensor 159 is the signal SG1 shown in FIG. 12, the detection signal is a detection signal having no relationship with the discharging flag and the predetermined height flag and a determination result in step S204 is "Yes". Then, the controller 7 returns to step S203. On the other hand, when the detection signal of the sensor 159 is not the signal SG1 shown in FIG. 12, the detection signal is a detection signal having relationship with the discharging flag and the predetermined height flag and a determination result in step S204 is "No". Then, the controller 7 proceeds to step S205.

When the controller 7 proceeds to step S205, the controller 7 sets the discharging flag to ON.

Then, in step S206, the controller 7 starts timer measurement.

Then, in step S207, the controller 7 determines whether the detection signal of the sensor 159 is switched from ON to OFF. When a determination result in step S207 is "Yes", the controller 7 proceeds to step S208, sets the discharging flag to OFF and returns to step S203. On the other hand, when a determination result in step S207 is "No", the controller 7 proceeds to step S209.

When the controller 7 proceeds to step S209, the controller 7 determines whether timer elapse time is equal to or greater than a predetermined threshold value G2. The predetermined threshold value G2 is set based on consumed time for which the sheet SH passed through the discharge opening 69. When a determination result in step S209 is "No", the controller 7 returns to step S207. On the other hand, when a determination result in step S209 is "Yes", the controller 7 proceeds to step S210.

When the controller 7 proceeds to step S210, the controller 7 sets the discharging flag to OFF and the predetermined height flag to ON.

Then, in step S211, the controller 7 determines whether the detection signal of the sensor 159 is switched from ON to OFF. When a determination result in step S211 is "Yes", the controller 7 proceeds to step S212, sets the predetermined height flag to OFF and returns to step S203. On the other hand, when a determination result in step S211 is "No", the controller 7 repetitively executes the processing of step S211.

The controller 7 may determine whether there is the sheet SH passing through the discharge opening 69, based on the ON/OFF information of the discharging flag. Also, the controller 7 may determine whether the sheets SH supported on the discharge tray 96 are lower than the predetermined height H1, based on the ON/OFF information of the predetermined height flag.

When the ON/OFF switching program of the flag indicating that there is a sheet on the supply tray shown in FIG. 15 starts, the controller 7 initially sets a flag indicating that there is a sheet on the supply tray to OFF, in step S301.

Then, in step S302, the controller 7 starts to monitor the detection signal of the sensor 159. The controller 7 continues to monitor the detection signal of the sensor 159 until the power supply of the image reading apparatus 1 becomes off.

Then, in step S303, the controller 7 determine whether the detection signal of the sensor 159 is switched from OFF to ON. When a determination result in step S303 is "No", the controller 7 repetitively executes the processing of step S303. On the other hand, when a determination result in step S303 is "Yes", the controller 7 proceeds to step S304.

When the controller 7 proceeds to step S304, the controller 7 determines whether the detection signal of the sensor 159 is a waveform corresponding to the branched shape of the detection target part 153A of the third actuator 153. When the detection signal of the sensor 159 is not the signal SG1 shown in FIG. 12, the detection signal is a detection signal having no relationship with the flag indicating that there is a sheet on the supply tray and a determination result in step S304 is "No". Then, the controller 7 returns to step S303. On the other hand, when the detection signal of the sensor 159 is the signal SG1 shown in FIG. 12, the detection signal is a detection signal having relationship with the flag indicating that there is a sheet on the supply tray and a determination result in step S304 is "Yes". Then, the controller 7 proceeds to step S305.

When the controller 7 proceeds to step S305, the controller 7 determines whether the flag indicating that there is a sheet on the supply tray is ON. When a determination result in step S305 is "Yes", the controller 7 proceeds to step S306, sets the flag indicating that there is a sheet on the supply tray to OFF, and then returns to step S303. On the other hand, when a determination result in step S305 is "No", the controller 7 proceeds to step S307, sets the flag indicating that there is a sheet on the supply tray to ON, and then returns to step S303.

The controller 7 may determine whether there is the sheet SH supported on the supply tray 91, based on the ON/OFF information of the flag indicating that there is a sheet on the supply tray.

<Image Reading Operation>

In the image reading apparatus 1, when reading an image on a document supported on the document support surface 8A, the controller 7 controls the scanning mechanism drive source 3M of the reading unit 3 to operate the scanning mechanism (not shown), so as to move the reading sensor 3S in the right and left direction between a reading start position below a left end edge of the document support surface 8A and a reading end position below a right end edge. Accordingly, the reading sensor 3S reads the image on the document supported on the document support surface 8A. Thereafter, the controller 7 controls the scanning mechanism drive source 3M of the reading unit 3 to operate the scanning mechanism (not shown) in a reverse direction, so as to move the reading sensor 3S having completed the reading from the right end to the left end in the reading unit 3 and returning the same to a standby position.

In the image reading apparatus 1, when conveying the sheet SH supported on the supply tray 91 by the automatic conveyance mechanism 4 and reading the image on the sheet SH, the controller 7 controls the scanning mechanism drive source 3M of the reading unit 3 to operate the scanning mechanism (not shown), so as to stop the reading sensor 3S at a stationary reading position below the reading surface 8B. Here, it is assumed that the movable plate 50 is located at the first position shown in FIG. 4 and the like, the discharge unit 60 is located at the third position shown in FIG. 4 and the like and the sheet SH is not supported on the discharge tray 96.

Subsequently, the controller 7 starts the image reading operation execution program shown in FIG. 13. In step S101, the controller 7 determines whether the flag indicating that there is a sheet on the supply tray is ON. When a determination result in step S101 is "No", the controller 7 proceeds to step S102 in which it is notified that there is no sheet on the supply tray 91, and then proceeds to step S108. On the other hand, when a determination result in step S101 is "Yes", the controller 7 proceeds to step S103.

When the controller 7 proceeds to step S103, the controller 7 executes the image reading operation. At this time, the controller 7 refers to the ON/OFF information of the discharging flag.

Specifically, the controller 7 determines whether the holder 42F is at the appropriate posture shown in FIGS. 4 and 5, based on the detection signal of the holder posture detection sensor 42J. When it is determined that the holder 42F is not at the appropriate posture shown in FIGS. 4 and 5, the controller 7 operates the first drive source M1, the first rotation drive train 110 and the second rotation drive train 120. Then, the controller 7 rotates the movable plate 50 from the first position shown in FIG. 4 and the like toward the second position shown in FIG. 5 and the like, and controls the holder 42F to keep the appropriate posture shown in FIGS. 4 and 5. At this time, the discharge unit 60 also rotates from the third position shown in FIG. 4 and the like toward the fourth position shown in FIG. 5 and the like, in synchronization with the rotation of the movable plate 50.

Then, the controller 7 operates the second drive source M2 and the conveyance drive train 130. Accordingly, the controller 7 drives the supply roller 41, the separation roller 42, the first conveyance roller 43, the second conveyance roller 44 and the discharge roller 47, feeds the sheet SH supported on the supply tray 91 to the conveyance guide 30 and conveys the same along the conveyance guide 30. The controller 7 reads an image on the sheet SH by the reading sensor 3S stopped at the stationary reading position when the sheet SH being conveyed passes above the reading surface 8B. Then, the controller 7 discharges the sheet SH of which the image has been read from the discharge opening 69 toward the discharge tray 96 by the discharge guide 61 of the discharge unit 60, the discharge roller 47 and the discharge pinch roller 48. When the discharging flag is switched from ON to OFF, the controller 7 determines that the image reading operation for one sheet SH is over, and proceeds to step S104.

When the controller 7 proceeds to step S104, the controller 7 determines whether the predetermined height flag is ON. When a determination result in step S104 is "No", the controller 7 returns to step S101. When there is the sheet SH supported on the supply tray 91, the controller 7 executes the image reading operation for a next sheet SH. On the other hand, when a determination result in step S104 is "Yes", the controller 7 returns to step S105.

When the controller 7 proceeds to step S105, the controller 7 determines whether the discharge unit 60 is located at the fourth position shown in FIG. 5 and the like, i.e., at the upper limit. In the first illustrative embodiment, the controller 7 sets the third position shown in FIG. 4 and the like as a home position, controls a rotating angle of the first drive source M1 (stepping motor) to always recognize the rotating angle information from the home position of the discharge unit 60, and makes the determination based on the rotating angle information. When a determination result in step S105 is "Yes", the controller 7 proceeds to step S106 in which it is notified that the sheets SH are fully loaded on the discharge tray 96, and then proceeds to step S108. On the other hand, when a determination result in step S105 is "No", the controller 7 proceeds to step S107.

When the controller 7 proceeds to step S107, the controller 7 rotates the movable plate 50 toward the second position shown in FIG. 5 and the like by a predetermined amount and rotates the discharge unit 60 toward the fourth position shown in FIG. 5 and the like by a predetermined amount. As a result, the discharge opening 69 of the discharge unit 60 is moved up to a height at which it does not interfere with the sheet SH to be discharged from the discharge opening 69 during a next image reading operation, and the predetermined height flag becomes OFF. Then, the controller 7 returns to step S101. When there is the sheet SH supported on the supply tray 91, the image reading operation is executed for a next sheet SH.

When the controller 7 proceeds from step S102 or step S106 to step S108, the controller 7 determines whether the predetermined height flag is ON, so as to determine a timing to rotate the discharge unit 60 from the fourth position shown in FIG. 5 and the like toward the third position shown in FIG. 4 and the like. When a determination result in step S108 is "No", the controller 7 proceeds to step S109. For example, when it is notified in step S102 that there is no sheet on the supply tray 91, a determination result in step S108 is "No", so that the controller 7 proceeds to step S109. Also, after it is notified in step S106 that the sheets SH are fully loaded on the discharge tray 96, when the user removes the sheets SH from the discharge tray 96, a determination result in step S108 is "No", so that the controller 7 proceeds to step S109. On the other hand, when a determination result in step S108 is "Yes", the controller 7 proceeds to step S110 in which it is notified that the sheets SH are fully loaded on the discharge tray 96 and then ends the processing.

When the controller 7 proceeds to step S109, the controller 7 returns the movable plate 50 and the discharge unit 60 to the home position, for a command of a next image reading operation. At this time, since the movable plate 50 and the discharge unit 60 operate in conjunction with each other by the above-described configurations of the first rotation drive train 110 and the second rotation drive train 120, only the discharge unit 60 cannot be returned to the home position. The controller 7 operates the first drive source M1, the first rotation drive train 110 and the second rotation drive train 120, so as to return the movable plate 50 to the first position shown in FIG. 4 and the like, i.e., the lower limit, and the discharge unit 60 to the third position shown in FIG. 4 and the like, i.e., the lower limit. At this time, the predetermined height flag becomes OFF. Thereafter, the controller 7 ends the processing.

<Operational Effects>

In the image reading apparatus 1 of the first illustrative embodiment, as shown in FIGS. 5, 9 and the like, the sheet detection unit 150 detects whether the sheets SH supported on the discharge tray 96 are lower than the predetermined height H1, based on the operations of the first actuator 151, the second actuator 152 and the sensor 159. Here, the predetermined height H1 is set to a height at which a posture of the discharge unit 60 when the discharge unit 60 moves toward the fourth position shown in FIG. 5 and the like can interfere with the sheet SH to be discharged from the discharge opening 69 of the discharge unit 60 during a next image reading operation. The predetermined height H1 becomes a full-load height in a state where the discharge unit 60 is located at the fourth position shown in FIG. 5 and the like, i.e., the upper limit.

As shown in steps S108 to S110 of FIG. 13, the controller 7 should return the movable plate 50 and the discharge unit 60 to the home position after the image reading operation is over and before a next image reading operation starts. At this time, since the movable plate 50 and the discharge unit 60 operate in conjunction with each other by the above-described configurations of the first rotation drive train 110 and the second rotation drive train 120, only the discharge unit 60 cannot be returned to the home position. The controller 7 checks that the sheets SH of the predetermined height H1 or higher, i.e., the full-load height are not left on the discharge tray 96, based on the detection result of the sheet detection unit 150, and then determines the timing to rotate the discharge unit 60 from the fourth position shown in FIG. 5 and the like toward the third position shown in FIG. 4 and the like. Accordingly, the image reading apparatus 1 can start a next image reading operation in a state where the movable plate 50 and the discharge unit 60 are returned to the home position and the movable plate 50 is located at the lower limit position at which the sheet SH can be easily supported to the supply tray 91 and in the state where the discharge opening 69 of the discharge unit 60 is located at the lower limit position and the sheets SH of the predetermined height H1 or higher are not left on the discharge tray 96.

Therefore, according to the image reading apparatus 1 of the first illustrative embodiment, it is possible to suppress the jamming of the sheet SH to be discharged from the discharge opening 69.

Also, in the image reading apparatus 1, as shown in FIGS. 4, 5 and the like, the first actuator 151 is provided to the discharge unit 60 and moves together with the discharge unit 60. Therefore, even when the number of the sheets SH supported to the discharge tray 96 increases, it is possible to keep the relative positional relationship between the sheets SH and the first actuator 151 at the appropriate state. As a result, it is possible to suppress a situation where the detection accuracy of the sensor 159 is lowered in association with the rotation of the discharge unit 60.

Also, in the image reading apparatus 1, the first actuator 151 can also rotate when it is contacted to the sheet SH passing through the discharge opening 69. The controller 7 determines whether there is the sheet SH passing through the discharge opening 69 and whether the sheets SH supported on the discharge tray 96 are lower than the predetermined height H1, as shown in FIG. 14, based on the detection signal of the sensor 159, for example, the waveforms of the signals SG2, SG3 shown in FIG. 12. By this configuration, since the controller 7 can make the two determinations by the single sheet detection unit 150, it is possible to reduce the manufacturing cost.

Also, in the image reading apparatus 1, as shown in FIGS. 4, 6, 9 and the like, the first actuator 151 of the sheet detection unit 150 is supported to the discharge unit 60 to be rotatable about the second shaft axis X2 of which the relative positional relationship with the discharge tray 96 changes in association with the rotation of the discharge unit 60. In the meantime, the second actuator 152 rotates about the first shaft axis X1 in conjunction with the rotation of the first actuator 151. The sensor 159 has the constant relative positional relationship with the discharge tray 96 and detects the rotation of the second actuator 152. That is, even when the discharge unit 60 rotates, the sensor 159 does not move, and the second actuator 152 operates in conjunction with the first actuator 151 configured to move together with the discharge unit 60. Accordingly, it is possible to securely suppress the situation where the detection accuracy of the sheet detection unit 150 is lowered in association with the rotation of the discharge unit 60.

Also, in the image reading apparatus 1, as shown in FIGS. 9 and 10, it is possible to suppress the interlocking operation of the second actuator 152 with the first actuator 151 from being disturbed upon the rotation of the discharge unit 60 by the first drive train 160 including the gear 163 configured to rotate about the third shaft axis X3.

Also, in the image reading apparatus 1, as shown in FIG. 6 and the like, the first drive train 160 is independent from the second rotation drive train 120. By this configuration, upon the rotation of the discharge unit 60, the first drive train 160 is less likely to be influenced by the second rotation drive train 120, so that it is possible to suppress the interlocking operation of the second actuator 152 with the first actuator 151 from being disturbed.

Also, in the image reading apparatus 1, as shown in FIGS. 4, 6 and the like, the first actuator 151 can rotate about the same second shaft axis X2 as the discharge roller 47. By this configuration, it is possible to easily arrange the first actuator 151 at the position at which the first actuator can easily contact the sheet SH passing through the discharge opening 69.

Also, in the image reading apparatus 1, as shown in FIG. 9 and the like, it is possible to securely operate the second actuator 152 in conjunction with the first actuator 151 by the first drive train 160 including the first gear 161, the gear 163 and the second gear 162.

Also, in the image reading apparatus 1, as shown in FIGS. 4, 11 and the like, the sheet detection unit 150 includes the third actuator 153, and the sensor 159 further detects the rotation of the third actuator 153. By this configuration, since the controller 7 can determine whether there is the sheet SH supported on the supply tray 91 by the single sheet detection unit 150, it is possible to further reduce the manufacturing cost. At this time, by the configuration where the sensor 159 does not move even when the discharge unit 60 rotates, it is possible to suppress the detection accuracy of the sensor 159 configured to detect the rotation of the third actuator 153 from being lowered.

Also, in the image reading apparatus 1, as shown in FIGS. 6, 9, 11 and the like, the second actuator 152 and the third actuator 153 rotate about the same first shaft axis X1. Therefore, the sensor 159 can detect the movement of the second actuator 152 and the movement of the third actuator 153 with the same detection accuracy.

Also, in the image reading apparatus 1, as shown in FIG. 11, the detection target part 153A that is detected by the sensor 159 of the third actuator 153 has the branched shape having two branches extending in parallel with each other. When the waveform of the detection signal is the waveform corresponding to the branched shape of the third actuator 153, for example, the waveform of the signal SG1 shown in FIG. 12, the controller 7 determines whether there is the sheet SH supported on the supply tray 91, as shown in FIG. 15. Accordingly, since the controller 7 can make the three determinations, it is possible to further reduce the manufacturing cost.

Second Illustrative Embodiment

Figure 16:
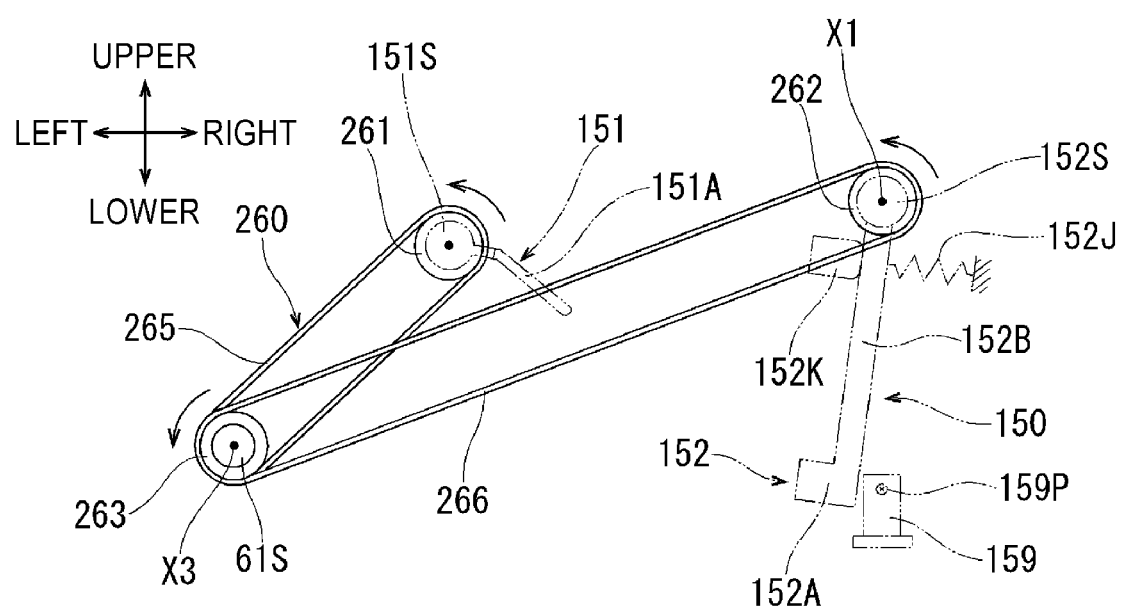
FIG. 16 relates to an image reading apparatus of a second illustrative embodiment, illustrating a sensor, a first actuator, a second actuator, a first drive train and the like of a sheet detection unit.

As shown in FIG. 16, an image reading apparatus of a second illustrative embodiment employs a first drive train 260, instead of the first drive train 160 of the image reading apparatus 1 of the first illustrative embodiment. The other configurations of the second illustrative embodiment are the same as the first illustrative embodiment. Accordingly, the same configurations as the first illustrative embodiment are denoted with the same reference numerals and the descriptions thereof are omitted or simplified.

The first drive train 260 includes a first pulley 261, a pulley 263, a second pulley 262 and timing belts 265, 266. The pulley 263 is an example of the rotary member.

The first pulley 261 is fixed to the front end portion of the transmission shaft 151S of the first actuator 151, instead of the first gear 161 of the first illustrative embodiment, and is configured to rotate about the second shaft axis X2 together with the first actuator 151.

The pulley 263 is inserted in the front shaft part 61S of the discharge guide 61, instead of the gear 163 of the first illustrative embodiment and is configured to be rotatable about the third shaft axis X3, independently from the discharge unit 60.

The second pulley 262 is fixed to the front end portion of the transmission shaft 152S of the second actuator 152, instead of the second gear 162 of the first illustrative embodiment, and is configured to be rotatable about the first shaft axis X1 together with the second actuator 152.

The timing belt 265 is wound on the first pulley 261 and the pulley 263. The timing belt 266 is wound on the pulley 263 and the second pulley 262.

That is, the first drive train 260 includes the pulley 263 capable of rotating about the third shaft axis X3 and is configured to couple the first actuator 151 and the second actuator 152 each other via the pulley 263. The first drive train 260 is configured to rotate the second actuator 152 in conjunction with the rotation of the first actuator 151.

In the image reading apparatus of the second illustrative embodiment configured as described above, it is possible to suppress the jamming of the sheet SH to be discharged from the discharge opening 69, like the image reading apparatus 1 of the first illustrative embodiment.

Also, in the image reading apparatus, it is possible to suppress the interlocking operation of the second actuator 152 with the first actuator 151 from being disturbed upon the rotation of the discharge unit 60 by the first drive train 260 including the pulley 263.

Although the present invention has been described with reference to the first and second illustrative embodiments, the present invention is not limited to the first and second illustrative embodiments and can be appropriately changed without departing from the gist of the present invention.

For example, the inventive concept of the present invention can be applied to an image reading apparatus, a complex machine and the like.

The invention claimed is:

1. An image reading apparatus comprising:
    a supply tray configured to support sheets to be fed and including a movable plate configured to move from a first position to a second position in correspondence to reduction in a number of the sheets supported on the supply tray, the second position being higher than the first position;
    a discharge tray located below the supply tray and configured to support discharged sheets;
    a conveyance guide configured to guide a sheet conveyed from the supply tray toward the discharge tray;
    a reading sensor configured to read an image on the sheet conveyed along the conveyance guide;
    a discharge unit having a discharge opening for discharging the sheet conveyed along the conveyance guide to the discharge tray and configured to move from a third position to a fourth position in correspondence to reduction in the number of the sheets supported on the supply tray, the fourth position being higher than the third position;
    a controller configured to control movements of the movable plate and the discharge unit; and
    a sheet detection unit configured to detect whether the sheets supported on the discharge tray is lower than a predetermined height,
    wherein the controller is configured to determine a timing to move the discharge unit from the fourth position toward the third position based on a detection result of the sheet detection unit.

2. The image reading apparatus according to claim 1, wherein the sheet detection unit includes:
    a first actuator provided to the discharge unit and configured to move by contacting the sheet supported on the discharge tray; and
    a sensor configured to detect movement of the first actuator and output a detection signal based on a detection result to the controller.

3. The image reading apparatus according to claim 2,
    wherein the first actuator is configured to move also by contacting a sheet passing through the discharge opening, and
    wherein the controller is configured to distinguish between determination as to whether there is a sheet passing the discharge opening and determination as to whether the sheets supported on the discharge tray is lower than the predetermined height, based on a waveform of the detection signal.

4. The image reading apparatus according to claim 2,
    wherein the sheet detection unit further includes a second actuator configured to rotate about a first shaft axis of which a relative positional relationship with the discharge tray is constant,
    wherein the first actuator is supported to the discharge unit to be rotatable about a second shaft axis of which a relative positional relationship with the discharge tray changes in association with the movement of the discharge unit,
    wherein the second actuator is configured to rotate about the first shaft axis in conjunction with rotation of the first actuator, and
    wherein the sensor has a constant relative positional relationship with the discharge tray and is configured to detect rotation of the second actuator.

5. The image reading apparatus according to claim 4,
    wherein the sheet detection unit further includes a first drive train for rotating the second actuator in conjunction with the rotation of the first actuator,
    wherein the discharge unit is configured to rotate about a third shaft axis, and
    wherein the first drive train includes a rotary member configured to rotate about the third shaft axis and is configured to couple the first actuator and the second actuator each other via the rotary member.

6. The image reading apparatus according to claim 5, further comprising:
    a second drive train for rotating the discharge unit about the third shaft axis,
    wherein the first drive train is independent from the second drive train.

7. The image reading apparatus according to claim 5,
    wherein the third shaft axis is in parallel with the second shaft axis, and
    wherein the discharge unit includes a discharge roller configured to rotate about the second shaft axis.

8. The image reading apparatus according to claim 7, wherein the first drive train includes:
    a first gear provided to be rotatable about the second shaft axis together with the first actuator;
    the rotary member that is a gear in mesh with the first gear; and
    a second gear provided to be rotatable about the first shaft axis together with the second actuator and configured to rotate by a drive force received from the rotary member.

9. The image reading apparatus according to claim 4,
    wherein the sheet detection unit further includes a third actuator provided to the supply tray and configured to move by contacting a sheet supported on the supply tray, and
    wherein the sensor is configured to further detect movement of the third actuator.

10. The image reading apparatus according to claim 9, wherein the third actuator is supported to be rotatable about the first shaft axis.

11. The image reading apparatus according to claim 10, wherein a detection target part of the third actuator to be detected by the sensor has a branched shape having a plurality of branches, and wherein the controller is configured to determine whether there is the sheet supported on the supply tray when a waveform of the detection signal is a waveform corresponding to the branched shape of the third actuator.

* * * * *